(12) United States Patent
Araujo et al.

(10) Patent No.: US 12,554,263 B2
(45) Date of Patent: Feb. 17, 2026

(54) DRONE-ASSISTED VEHICLE EMERGENCY RESPONSE SYSTEM

(71) Applicant: GM GLOBAL TECHNOLOGY OPERATIONS LLC, Detroit, MI (US)

(72) Inventors: William C. Araujo, Claremont, CA (US); Russell A. Patenaude, Macomb Township, MI (US); Luke J. Popiel, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 488 days.

(21) Appl. No.: 18/097,718

(22) Filed: Jan. 17, 2023

(65) Prior Publication Data

US 2024/0241520 A1    Jul. 18, 2024

(51) Int. Cl.
| | |
|---|---|
| *H04W 4/90* | (2018.01) |
| *B64D 45/00* | (2006.01) |
| *B64U 20/80* | (2023.01) |
| *B64U 50/37* | (2023.01) |
| *B64U 50/39* | (2023.01) |
| *B64U 101/20* | (2023.01) |

(Continued)

(52) U.S. Cl.
CPC ............ *G05D 1/101* (2013.01); *B64D 45/00* (2013.01); *B64U 20/80* (2023.01); *B64U 50/37* (2023.01); *B64U 50/39* (2023.01); *H04W 4/90* (2018.02); *B64U 2101/20* (2023.01); *B64U 2101/56* (2023.01)

(58) Field of Classification Search
None
See application file for complete search history.

(56) References Cited

U.S. PATENT DOCUMENTS

| 7,755,496 B1 * | 7/2010 | Bernstein ............... G08B 5/002 340/573.3 |
| 9,409,644 B2 | 8/2016 | Stanek et al. |

(Continued)

FOREIGN PATENT DOCUMENTS

| GB | 2548369 A | 2/2021 |
| JP | 2018-040744 A | 3/2018 |

OTHER PUBLICATIONS

Lee, Shiou Yih, et al. "Assessing safety and suitability of old trails for hiking using ground and drone surveys." ISPRS International Journal of Geo-Information 9.4 (2020): 221. (Year: 2020).*

(Continued)

*Primary Examiner* — Maria S Ayad
(74) *Attorney, Agent, or Firm* — Quinn IP Law

(57) ABSTRACT

Aspects of drone-assisted offroad vehicle emergency systems are addressed. In one aspect, a system includes an offroad vehicle having integrated therein a processing system coupled to a user interface. The processing system is configured to respond to a potential emergency situation including a stranded or lost person or a hazardous condition in a path of the vehicle. An aerial drone is equipped with multiple sensors for receiving data. Responsive to a trigger, the processing system may instruct the drone to deploy one or more times to survey a target region. The drone may receive sensor data relevant to an emergency situation and relay the data back to the vehicle. The processing system analyzes the data to provide a remedial response.

20 Claims, 6 Drawing Sheets

(51) Int. Cl.
*B64U 101/56* (2023.01)
*G05D 1/00* (2024.01)

(56) References Cited

U.S. PATENT DOCUMENTS

| | | | |
|---|---|---|---|
| 9,471,059 B1* | 10/2016 | Wilkins | G05D 1/0016 |
| 10,137,984 B1* | 11/2018 | Flick | G08G 5/74 |
| 10,216,181 B2* | 2/2019 | Fox | G08B 25/016 |
| 10,239,614 B2* | 3/2019 | Lesser | B64D 45/00 |
| 10,248,120 B1 | 4/2019 | Siegel et al. | |
| 10,370,102 B2* | 8/2019 | Boykin | H04R 1/406 |
| 10,529,233 B1* | 1/2020 | Vieten | G08G 1/143 |
| 10,739,153 B2* | 8/2020 | DeLuca | G01C 21/3605 |
| 10,916,151 B2* | 2/2021 | Mulhall | G08G 5/59 |
| 11,816,624 B2* | 11/2023 | Goldberg | G08G 5/22 |
| 12,031,800 B2* | 7/2024 | O' Sullivan | F41G 7/2246 |
| 12,143,896 B2* | 11/2024 | Lei | H04W 4/029 |
| 2008/0177994 A1* | 7/2008 | Mayer | G06F 16/00 709/224 |
| 2012/0064855 A1* | 3/2012 | Mendelson | G01S 1/68 455/404.1 |
| 2013/0211720 A1 | 8/2013 | Niemz | |
| 2014/0316614 A1 | 10/2014 | Newman | |
| 2017/0061217 A1 | 3/2017 | Cha et al. | |
| 2018/0050800 A1* | 2/2018 | Boykin | H04N 21/2368 |
| 2018/0128894 A1* | 5/2018 | Kaio | H04B 17/00 |
| 2019/0051046 A1* | 2/2019 | Jin | G08G 1/0126 |
| 2019/0197890 A1* | 6/2019 | Du | G05D 1/12 |
| 2019/0226862 A1* | 7/2019 | Shaukat | G07C 5/008 |
| 2019/0227555 A1* | 7/2019 | Sun | G08G 1/142 |
| 2020/0164981 A1 | 5/2020 | Chundi | |
| 2020/0242984 A1* | 7/2020 | Salem | B64B 1/58 |
| 2020/0278689 A1* | 9/2020 | Larson | G05D 1/0094 |
| 2020/0346751 A1* | 11/2020 | Horelik | G05D 1/46 |
| 2020/0398985 A1* | 12/2020 | Hsu | G08G 1/096827 |
| 2021/0063172 A1 | 3/2021 | Jung et al. | |
| 2021/0398434 A1* | 12/2021 | Madden | G08G 5/56 |
| 2022/0107194 A1* | 4/2022 | Hagström | G01C 21/3697 |
| 2023/0040748 A1* | 2/2023 | Jia | H04W 4/23 |
| 2023/0152106 A1 | 5/2023 | Giovanardi | |
| 2024/0019864 A1* | 1/2024 | Elshenawy | B64C 39/024 |
| 2024/0192009 A1* | 6/2024 | Araujo | B64C 39/024 |

OTHER PUBLICATIONS

Daud, Sharifah Mastura Syed Mohd, et al. "Applications of drone in disaster management: A scoping review." Science & Justice 62.1 (2022): 30-42. (Year: 2022).*

Lyu, M., Zhao, Y., Huang, C. and Huang, H., 2023. Unmanned aerial vehicles for search and rescue: A survey. Remote Sensing, 15 (13), p. 3266. (Year: 2023).*

Drone-Aided Path Planning for Unmanned Ground Vehicle Rapid Traversing Obstacle Area. Electronics (Basel) (2022): n. pag. Web. https://www.mdpi.com/2079-9292/11/8/1228 (Year: 2022).

Society of Automotive Engineers, J3016_202104 Taxonomy and Definitions for Terms Related to Driving Automation Systems for On-Road Motor Vehicles, https://www.sae.org/standards/content/j3016_202104/ (Year: 2021).

* cited by examiner

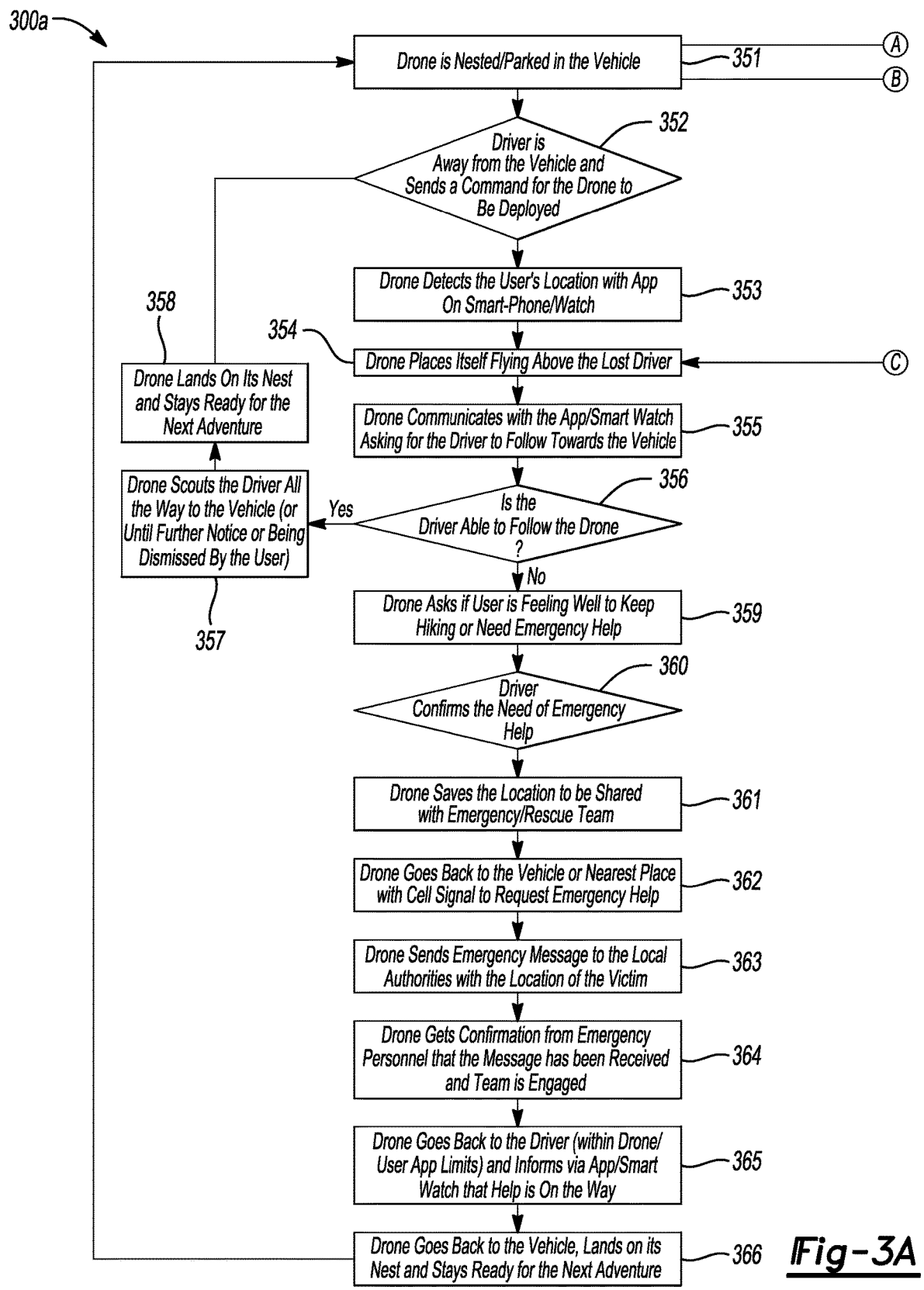

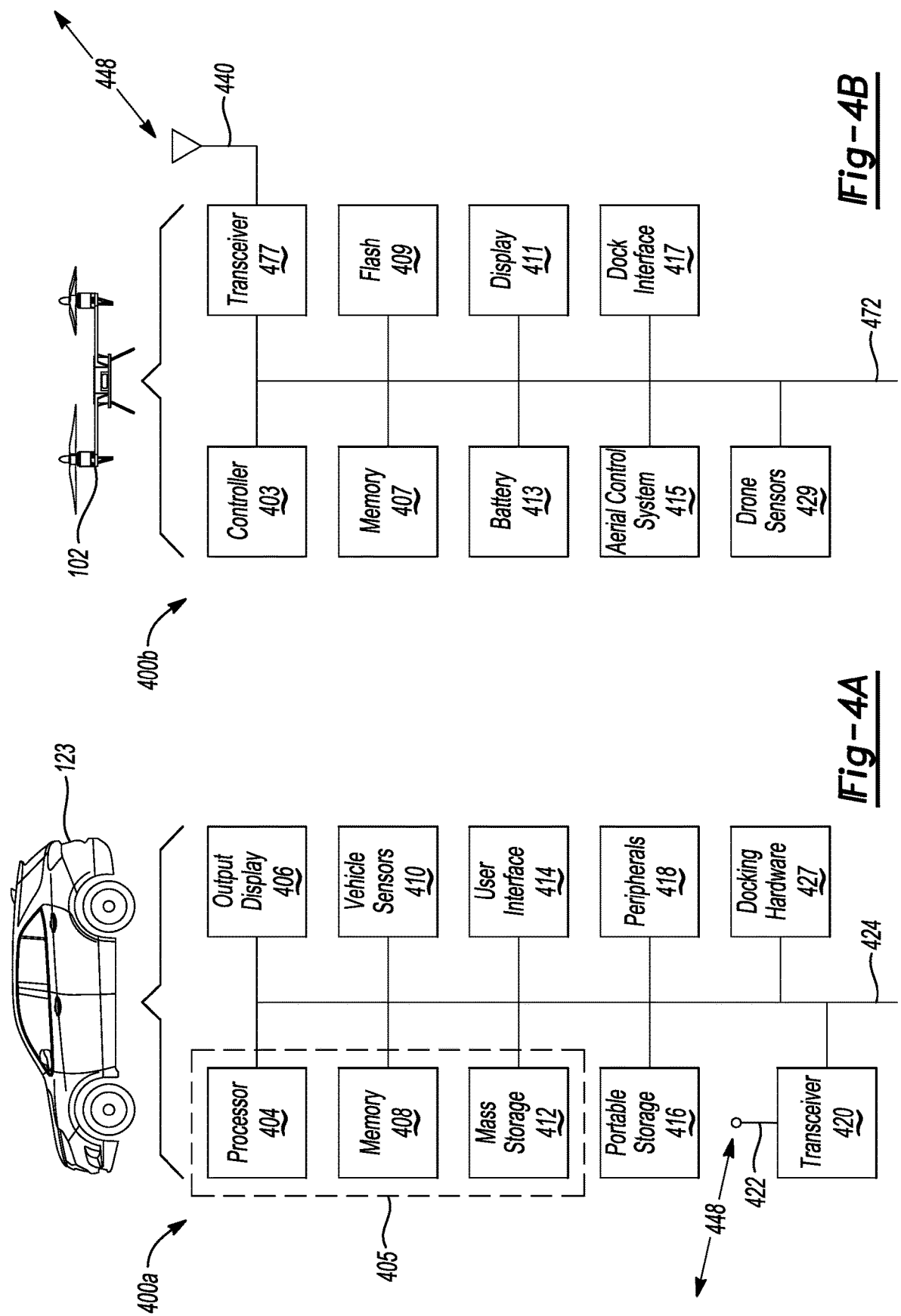

DRONE-ASSISTED VEHICLE EMERGENCY RESPONSE SYSTEM

INTRODUCTION

The increased sophistication of technologies characterizing modern vehicles, including but not limited to offroad vehicles, has created a continued progression by consumers to acquire and use such vehicles in more challenging and diverse offroad terrains. Consumers have faced new challenges and potential dangers in exploring unfamiliar terrains with unpredictable features, which may include a variety of hazardous conditions that may not be readily apparent to the vehicle occupants. Such occupants may include hikers that drive to an unfamiliar area and set off from the vehicle on foot. In cases where a hiker becomes lost or stranded due to dangerous surroundings or other factors like dehydration, exhaustion, or suffering of bodily harm, the hiker may also lack the ability to successfully return to the vehicle or other place of refuge.

A need exists in the art to facilitate the enjoyment of off-roading, hiking, and vehicle use in general while concurrently reducing inherent risks attendant with these activities.

SUMMARY

The present disclosure expands the precision and robustness of modern navigational systems in an offroad context by integrating information obtained by an aerial drone ("drone") scouting a target region with a central, artificial-intelligence-based application suite, sometimes referred to as an "artificial intelligence (AI) system," executing on a processing system of a vehicle or drone. The vehicle may deploy the drone to survey a target region, whether ahead of the vehicle or in an expected area where one or more persons may be lost or stranded. The drone may scout the region and communicate back to the vehicle data from its sensors that relates to a potential emergency situation, including missing or hurt persons or hazardous conditions such as inclement weather or dangerous obstacles that may result in harm to the vehicle occupants if not timely addressed. Non-exhaustive examples of these hazardous conditions include wildfires based on temperature readings, landslides, flood conditions, unnavigable terrain, and the like.

In various embodiments, the lost person may possess a mobile device such as a smartphone, smartwatch, or other hardware upon which is loaded an application enabling a nearby drone to initiate or receive contact from the lost person via cellular coverage or via a local, point-to-point network or other connection. The drone may receive, at an arbitrary time, instructions from the vehicle based on the processing system once the latter is prompted by the drone or person of a potential emergency situation. The processing system may make a determination of an optimal remedial course of action, taking into account the known circumstances along with knowledge, including self-learned information, in a database. In other embodiments, the drone may act directly to locate and query the lost or stranded persons via the application on the mobile device.

In an aspect of the present disclosure, a drone-assisted vehicle emergency system includes an offroad vehicle having integrated therein a processing system coupled to a user interface. The processing system is configured to respond to a potential emergency situation including a stranded or lost person or a hazardous condition in a path of the vehicle.

An aerial drone is communicatively coupled to the vehicle. The drone includes a controller coupled to sensors for receiving data. The vehicle and the drone are configured to communicate using a wireless data link.

Responsive to a trigger, the processing system is configured to instruct the drone to deploy one or more times to survey a target region. During one of the deployments, the drone is configured to receive data from at least one of the sensors relevant to the potential emergency situation and to relay the data back to the vehicle for a determination by the processing system of a remedial response thereto.

In various embodiments, upon receiving data at the vehicle from the drone relevant to a detected hazardous condition, the processing system is configured to selectively provide, via the user interface, information comprising a warning, or a recommendation for successfully evading the detected hazardous condition. The hazardous condition may include unnavigable terrain, unstable soil conditions, a wildfire, a fallen tree, a narrow passage bordering a steep incline, fog, rain, an object or debris on the path, or an obstacle subjecting the vehicle to a potential rollover. The hazardous condition may include a landslide risk based on an evaluated region of inclined terrain proximate the path of the vehicle, the evaluated region having detected heavily saturated soil or moving rocks.

In various embodiments, the trigger may include a communication from the lost or stranded person to the drone, directly or relayed from the vehicle. The trigger may include expiration of a timer. The timer may be set by the stranded or lost person in the vehicle or another vehicle occupant prior to the person departing the vehicle on foot. The drone may be configured to attempt to locate the stranded or lost person in the target region. Upon identifying the person, the drone may be configured to perform controlled maneuvers to guide the person in returning to the vehicle. During at least one of the deployments, the drone may be configured to provide directions or requests for data to an application on a mobile device in a possession of, or proximate the stranded or lost person. During at least one of the deployments, the drone may further be configured to receive sensor data including communications from the stranded or lost person relevant to a condition of the person using the application on the mobile device with the person. The drone may relay the communications to the vehicle.

In various embodiments, upon locating the stranded or lost person and determining a need for professional assistance, the drone may be configured to maneuver to a location having cellular coverage and to transmit a signal notifying emergency services of the stranded or lost person. The drone may further be configured to transmit data received from one or more of the sensors relevant to a location of the stranded or lost person relative to the vehicle or to a designated facility. The processing system may further be configured to estimate a time of arrival at a destination and to deploy the drone to the destination at or immediately prior to the estimated time.

In another aspect of the disclosure, a drone-assisted vehicle emergency system includes an offroad vehicle having integrated therein a processing system coupled to a user interface. The processing system is configured to respond to a potential emergency situation including detecting and assisting a stranded or lost person originating on foot from the vehicle.

An aerial drone is communicatively coupled to the vehicle. The drone includes a controller coupled to sensors for receiving data. The vehicle and the drone are configured to communicate using a wireless data link.

Responsive to a trigger, the processing system is configured to instruct the drone to deploy one or more times and survey a target region to locate the person. During one of the deployments, the drone is configured to receive data from the sensors identifying the person, transmit to the vehicle a location of the person, and provide assistance to the person in returning to a location of refuge or in receiving emergency assistance.

In various embodiments, the drone may be configured to provide the assistance by performing one or more of (i) communicating instructions or receiving feedback to or from the person, respectively, via a mobile device on the person, (ii) performing guiding maneuvers to accompany the person back to the vehicle or other location of refuge, (iii) notifying emergency services, directly or via the vehicle, or (iv) notifying the person that emergency assistance has been alerted and are engaging to provide assistance, In various embodiments, upon receiving at the vehicle from the drone the location of the person, the processing system may be configured to evaluate a remedial course of action and to send instructions relating thereto to the drone. The drone may be configured to return to the vehicle when needed to recharge or receive a new battery. The processing system may be configured to determine a remedial response upon receiving data identifying the hazardous condition or a possibility thereof. At least one of the potential remedial responses may include deploying the drone one or more times to identify details of the hazardous condition and an alternative route to avoid the hazardous condition.

In various embodiments, the hazardous condition may be identified by an occupant using the user interface to instruct the processing system to deploy the drone to survey a target region ahead of the vehicle.

In another aspect of the disclosure, a drone-assisted emergency vehicle system includes an offroad vehicle including a processing system coupled to a user interface. The processing system including a memory for storing executable code that, when executed on the processing system, performs tasks responsive to a prospective emergency situation. The system further includes an aerial drone equipped with sensors coupled to a controller to receive data. The drone is configured to deploy based on a command from the processing system or on a determination by the controller of the prospective emergency situation. The drone is configured to deploy based on a command from the processing system via a link with the vehicle or based on the controller identifying the prospective emergency situation. The drone is further configured to relay relevant portions of the data to the vehicle, to issue instructions and elicit feedback from the user regarding a condition of the user, and to maneuver back to the vehicle or to a location having a network connection enabling the drone to request emergency assistance or identify the hazardous condition.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes the various combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, explain the principles of the disclosure.

FIGS. 3A and 3B are a flow diagram illustrating an exemplary method of a vehicle deploying a drone to provide assistance to a lost or stranded person.

FIG. 4A is a block diagram illustrating a processing system and related elements of a vehicle for executing code for providing emergency assistance.

FIG. 4B is a block diagram illustrating hardware components of a drone used to assist the processing system in providing emergency assistance.

Figure 1A:
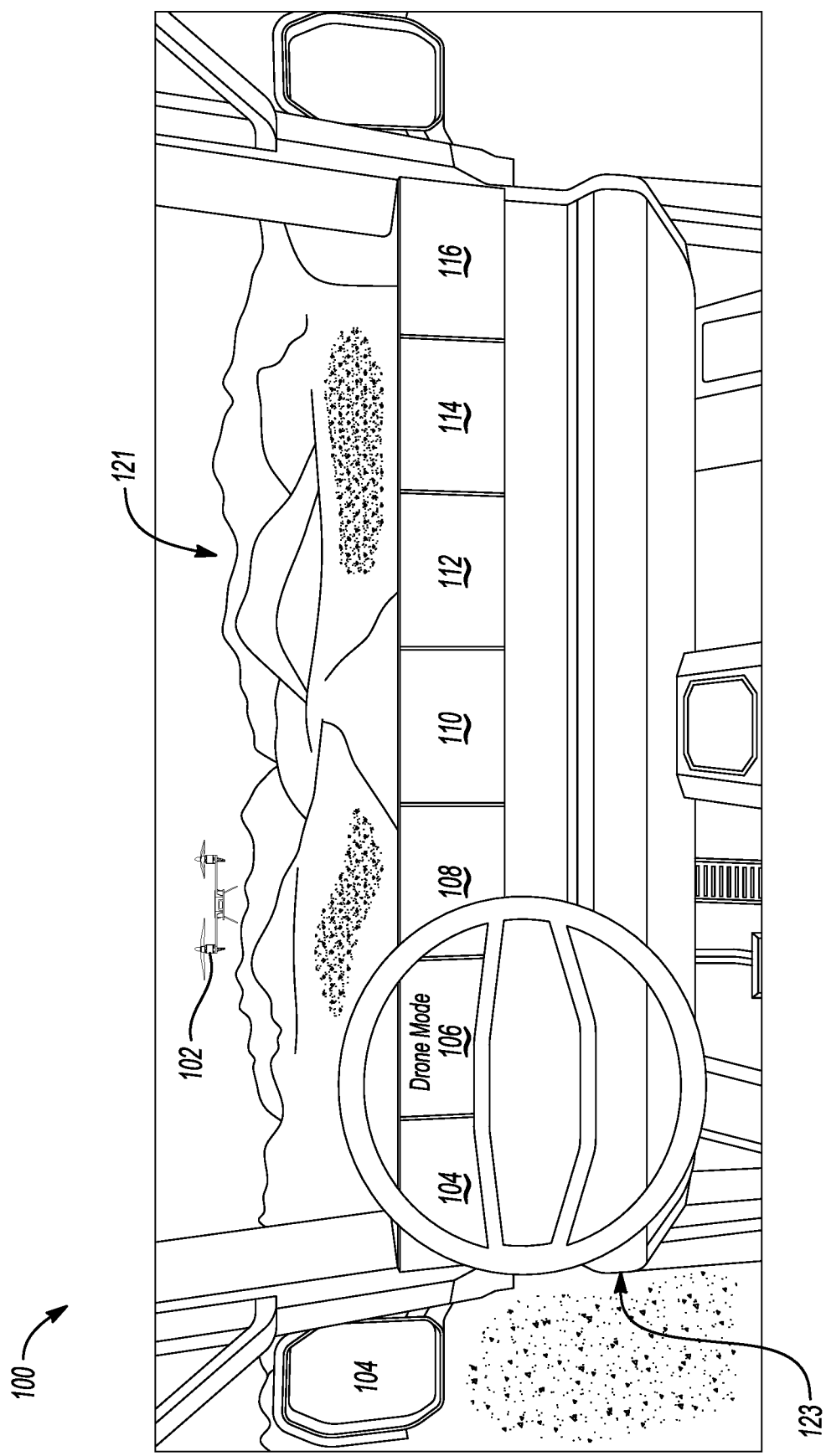
FIGS. 1A and 1B are conceptual diagrams of a system including a vehicle in an offroad area using drone technology to aerially scout a target region for dangerous conditions or missing persons.

The appended drawings are not necessarily to scale and may present a simplified representation of various features of the present disclosure as disclosed herein, including, for example, specific dimensions, orientations, locations, shapes and scale. Details associated with such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including," "containing," "comprising," "having," and the like shall mean "including without limitation." For example, "optimal vehicle routes" may include one or more optimal vehicle routes. Moreover, words of approximation such as "about," "almost," "substantially," "generally," "approximately," etc., may be used herein in the sense of "at, near, or nearly at," or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Aspects of the present disclosure are directed to systems, apparatuses and methods for integrating unmanned aerial drones ("drones") with a vehicle to provide emergency assistance and secure guidance for vehicle occupants or other persons in the vicinity of the drone and/or vehicle.

Drone technologies may potentially be equipped in some configurations with a network of on-board sensors including among others lidar, long range radar, sonar, transceivers with extended cellular antennas for communicating via 3G/4G/5G and related protocols, thermo-sensors, night vision sensors, high resolution or telephoto cameras, video cameras, acoustic recording devices, and combinations thereof, The drone may be communicatively coupled to the vehicle via one or more network protocols (e.g., Bluetooth, long-range Bluetooth, Wi-Fi, cellular (3G/4G/5G, etc.), satellite networks, proprietary networks, point-to-point networks, etc.) or coupled to the vehicle using one or more conductors when docked on or within the vehicle. The drone may be dependent on the vehicle, or instead the drone may be partly or largely autonomous in making strategic decisions and maneuvering from one location to another to locate a network-friendly location for transmitting a distress signal or to recharge or undergo battery replacement at the vehicle, or at a location of a hiker equipped with drone batteries.

The drone may in some cases be controlled by a central intelligent suite of integrated applications running on a processing system in the vehicle. The centralized applications may be part of the AI system that has a capacity for artificial intelligence. The AI system may, for example, continuously update an in-vehicle data repository for enabling the AI system to perform its functions more robustly and with increased precision. In some aspects, the AI system may be networked with a central facility for receiving updates, firmware upgrades, and information learned by the same AI system implemented with a different drone communicatively coupled to a different vehicle from an earlier event.

In various aspects, the vehicle's processing system may identify the presence of a potential emergency situation, based on its own sensors, communications from an occupant selecting a suitable input triggering the AI system, or based on the drone's current scouting of a region of interest. In such cases, the processing system, via its transceiver, may instruct the drone to deploy, redeploy, or relocate if already deployed to await further instructions or to take actions in assisting with gathering additional information relevant to the potential emergency situation.

The vehicle may commission the drone to evaluate potential familiar or unknown hazardous conditions. Hazards may include unnavigable pathways, unfavorable road/terrain conditions and features as described herein in detail, as well as stranded or lost persons for which an emergency response from medical or crisis-based personnel may be needed. In the course of its evaluation, the drone (via a controller and transceiver equipped with the drone and coupled to the drone's sensors (FIG. 4B)) may return data to the vehicle that provides the driver, through a user interface associated with the drone-augmented applications, advanced warning (s), and in some embodiments, recommendations for alternative routes. Non-exhaustive examples of such warnings may include warnings informing the driver of dangerous upcoming slope, approach, and/or departure angles, narrow passages bordering a cliff at night, foggy or raining conditions up ahead and the extent to which they may be having a direct effect on the regions at or near the vehicle's anticipated destination or pathways thereto, rocks, immobile persons or animals, debris, and other obstacles that may cause the vehicle to swerve or even roll over to avoid an external force event, detection and reporting of fallen trees or objects/debris in the road, hazardous depths of upcoming bodies of waters that the vehicle is not equipped to effectively navigate, information pertaining to the water current, rapid whitewater, potential risks of landslides or other hazards (e.g., based upon an assessment of hills or mountains with highly saturated soil or moving rocks), and the like. Wildfires and volcanic eruptions, while extreme events, may be detected through temperature sensing, infrared sensors, and other sensor-based techniques.

Figure 1B:
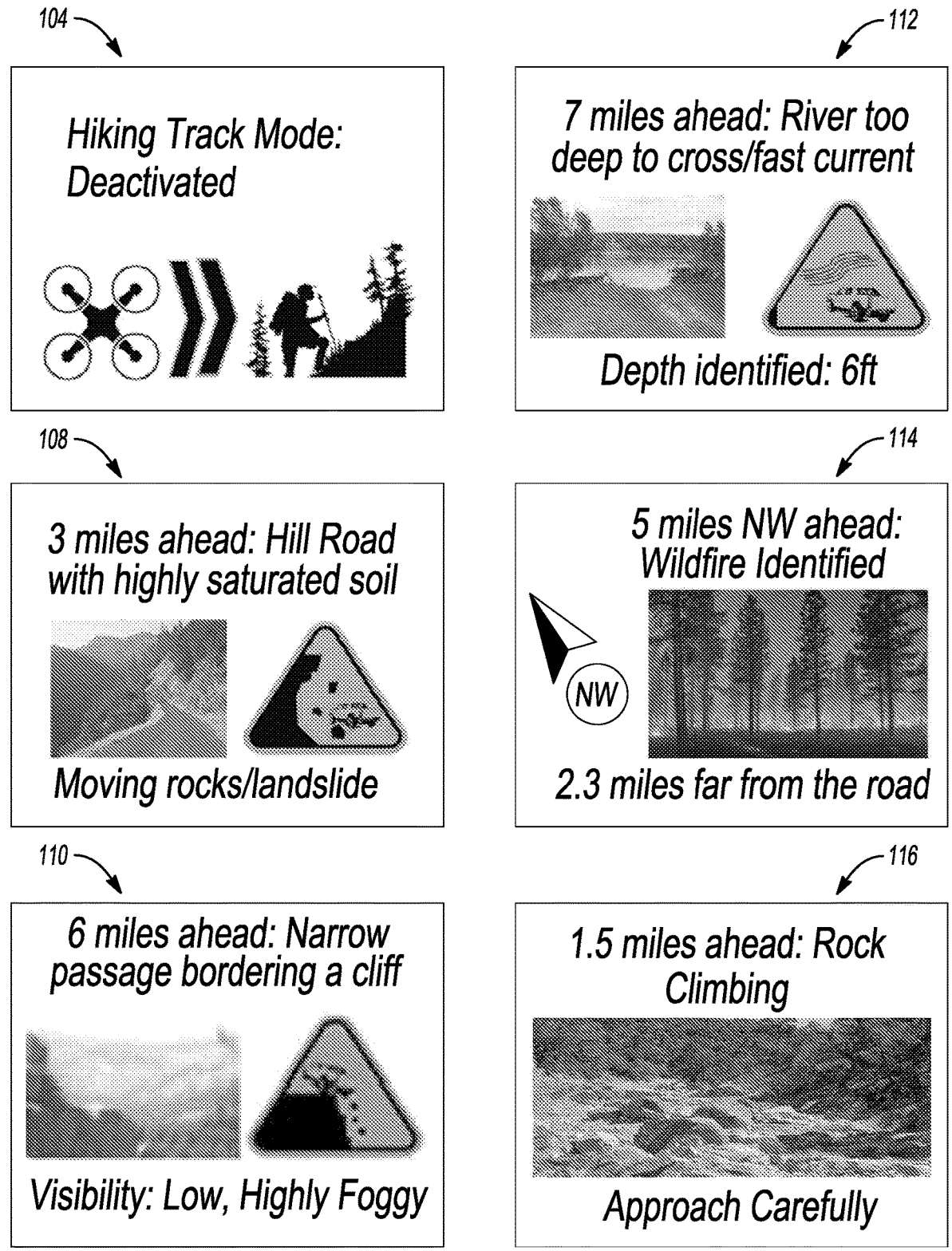

FIGS. 1A and 1B are conceptual diagrams of a system 100 including a vehicle 123 in or near an offroad area using drone technology to aerially scout a target region 121 for dangerous conditions or lost, stranded or missing persons. FIG. 1A shows the interior of a vehicle cabin. The dashboard of the vehicle includes an exemplary user interface for the drone-assisted system which incorporates the emergency assistance input/output array of functionality. As is evident from the illustrations, the user interface includes a semi-continuous array of partitioned panels described below by screens 104, 106, 108, 110, 112, 114 and 116, each panel in this configuration also constituting a touch screen with discrete input/output selection and touchpad capabilities. Examples of these screens are described in further detail in FIG. 1B. In other configurations, the output display and user interface may include separate controls, such as a discrete output display adjacent dedicated buttons or switches, a keypad, or other actuators for mechanically pressing, turning, etc. Thus, the user interface need be limited to a particular type of hardware or technology. In other example configurations, the output display may be discrete from the input interface, either of which may be scrollable via an adjacent input button. In various embodiments, the user interface need not require a display screen. For example, in one user interface configuration, the relevant data is conveyed to the driver via an automated voice. The driver may navigate accordingly. In various embodiments, the user interface may be configured with a microphone, such that the driver can communicate commands, instructions and data back to the processing system in response to certain voice commands or in other circumstances. Also, in some embodiments, the user interface may include an automated voice together with input switches or actuators for the driver to communicate needed information to the processing system. The particular arrangements of the output display(s) and the user interface may vary widely without departing from the principles of the present disclosure. These screens and displays that constitute an exemplary user interface according to an embodiment are described in more detail below.

The target region 121 may include an offroad region that may be selected by the vehicle occupants. The target region 121 may also be selected by the processing system in the vehicle 123 as well as the drone 102 based on input criteria from the driver or other occupants. In some configurations, the driver may specify an area ahead of the vehicle 123 as a target region. The driver may specify different directions as the target region to determine an optimal route that may include the least number of potentially hazardous conditions. The processing system may proceed to instruct the drone 102 to scout the target region 121 and to transmit back sensor data in real time during the flight. "In real time," "near real time" and like terms, for purposes of this disclosure, may include close to real time, such that natural latencies between a determination by the drone of an event based on sensor data and its transmission to the vehicle by the drone of the received data fall within the scope of, and qualify as, real time events. The processing system's remedial response may include different courses of action, including notifying emergency services and advising the vehicle occupants to remain in the vehicle, for example The target region 121 in some cases may be dynamic and may change depending on the real time selections of input data by the occupants of the vehicle 123, findings by the drone 102 via the drone sensors, evaluation of sensor data by the drone or by the processing system, and potentially other factors. In some arrangements, the target region 121 may remain static. The target region may also change as needed when the drone is in the course of providing data regarding alternative routes in an area and the current region is determined to be too dangerous to navigate further.

Underlying the output display mechanisms and user interfaces detailed in the example of FIG. 1A is the vehicle processing system (see FIG. 4A). The processing system may include one or more processors, memory, database storage, and other combinational logic, bios device(s), firmware, and the like. The processing system may perform, based on a trigger which may include powering on the vehicle, mobilizing the vehicle, or another type of internal or external trigger, determinations of a potential emergency situation based on sensor data or vehicle data, predictive algorithms, algorithms, and assessments and control of data received from the drone and vehicle sensors as well as data stored in a repository relevant to the target region 121 for detecting and characterizing potential emergency situations, including hazardous conditions (e.g., precipitation and bad weather, fog, physical obstacles and debris potentially in the way of the vehicle, cliffs, dangerous inclines, unnavigable terrain, wildfires, and numerous other hazards) as well as lost, missing or stranded persons, including hikers that departed the vehicle on foot or unrelated individuals identified to be in distress.

In the example case of wildfires and similar hazards, the processing system may be configured to deploy the drone on an aerial scout. In other cases, the drone may be already deployed. In either case, often miles away ahead of the vehicle, the drone may detect the presence of a wildfire through its sensors. In that event, the drone may relay the data back to the vehicle using its embedded sensors. In some cases, the drone may use the sensors along with its controller to interpolate data relating to the wildfire or to the weather. The types of information that the drone may interpolate and send back to the vehicle may also include an estimated proximity of the wildfire to the road, wind direction, the presence of smoke in the vicinity, the temperature, imagery and the like. The drone, on its own or with the assistance of the vehicle's processing system, may use the obtained sensor data to further provide a forecast predicting where the wildfire is happening at a given time. The processing system may provide an appropriate warning to the driver to enable the driver to avoid exposure to these risks and dangers. The processing system may also provide assistance for a safer escape route in case of evacuation driven by a wildfire warning given the drone's broad field of view provided in advance with its embedded sensor system.

It will be appreciated that the terms "processing system" and "processor" for purposes of this disclosure may not simply be limited to a single vehicle processor but may encompass plural or multiple processors and/or a variety of different physical circuit configurations. Non-exhaustive examples of the "processor" include (1) a plurality of processors in the vehicle that collectively perform the various navigation and routing-related tasks, and (2) processors of different types, including reduced instruction set computer (RISC)-based processors, complex instruction-set computer (CISC)-based processors. The procedures and instructions may be executed in software, hardware, firmware, middleware, application programming interfaces (APIs), or some combination thereof. The processing system may perform tasks using a layered architecture, with operating system code configured to communicate with driver software of other devices, or with dedicated hardware or a combination thereof.

The processing system may further include memory (e.g., dynamic or static random access memory ("DRAM" or "SRAM"), solid state drives, magnetic disk drives and other hard drives, flash memory including NAND memory, NOR memory and other types of available memory. The processing system may also include read only memory (ROM), programmable ROM, electrically erasable ROM (EEROM), and other available types of ROM. As noted, the processing system may be updateable, wirelessly via a network or when the vehicle is at a repair or service center. The memory in the processing system may further include one or more cache memories, which may be integrated into one or more individual processors/central processing units (CPUs), or which may be discrete devices, or some combination of both. The processing system in some implementations may include a system-on-a-chip (SoC), or more than one SoC for performing dedicated or distributed functions. Thus, as noted, the "processor system" in this disclosure may be implemented in software, or a combination of software and hardware in different possible ratios include hardware implementations such as digital signal processors (DSPs), application-specific integrated circuits (ASICs), field programmable gate arrays (FPGAs), discrete combinational logic, and the like. In these configurations, the processors may be coupled together via different circuit boards to form the processing system.

The processing system, in short, represents the physical components within the vehicle responsible for receiving data from the vehicle sensors and one or more memories within the vehicle and for executing the various programs related to the drone-based vehicle routing system. The processing system may further be coupled to one or more transceivers for sending and receiving data signals to and from the drone, respectively, or to an emergency service center or other location. Further detail describing the vehicle architecture and processing system is shown in FIG. 4A. The processing system may overlap in structure or function with other components (e.g., bus conductors, resistors, inductors, capacitors, transistors, diodes, etc.) without departing from the scope of the present disclosure.

The processing system may be configured to run, in one embodiment, a suite of applications. One, some or each of these applications may have artificial intelligence capabilities. Thus, the processing system may receive feedback regarding the results and consequences of its decisions given a particular set of circumstances and may store relevant portions of the feedback in a designated data repository in non-volatile memory for subsequent use in modifying or reinforcing its decision-making capabilities. In some embodiments, the vehicle 123 may be networked with a plurality of other vehicles that share data for use in artificial intelligence applications, thereby enabling the processing system to potentially learn at a faster rate.

Referring still to FIGS. 1A-B, the suite of applications may include a central application dedicated to handling potential emergency situations and providing emergency systems using the drone 102 and communication tools provided to the vehicle 123. The drone-equipped vehicle 123 and robust application software in the vehicle 123 may work in conjunction to provide emergency assistance for people (such as, among other, prior vehicle occupants) that are in distress and that, for example, have not returned to the vehicle 123 by a designated time. These aspects are addressed in more detail below.

In various embodiments, the drone 102 may provide important information to the vehicle 123 and driver by flying ahead of the vehicle 123, e.g., to a designated or target region that may generally coincide with a destination of the vehicle 123, if one presently exists, or with a general direction of the vehicle 123, or if nothing else, with a trial-and-error based collection of assessments concerning desired features or terrain. The drone 102 may assess a route or a collection of prospective alternative routes to detect and characterize risky environments and communicate relevant information back to the offroad driver and other vehicle occupants (e.g., a co-pilot assisting with entering information in the user interface or reading one or more output displays). For example, the drone 102 may convey the data back via long range Bluetooth or another network type to the vehicle's infotainment system sufficiently in advance to feed the occupants with valuable information characterizing relevant portions of the drone's latest payload based on its network of sensors. The data received from the drone's sensors may be received at the vehicle 123 from the drone 102 over an established communication link. At the vehicle 123, the processing system may evaluate the received data using its substantial processing power and predictive algorithms. In some embodiments, the predictive algorithms may be specifically designed and developed handling potential crises in the context of vehicle off-roading activities or hikes that may (but need not) originate from the vehicle 123. The AI system may ultimately be designed to facilitate the best decision-making possible by the driver and occupants, such that the best route based on avoiding dangerous terrain, and the welfare of the vehicle occupants, are taken into account as one of the main priorities.

In some embodiments, the processing system in the vehicle 123 may be equipped to assist in launching the drone 102 from the vehicle's docking station and maneuvering the drone 102. In other embodiments, the drone 102 retains many real-time capabilities. For example, in some embodiments during the course of a deployment such as a routine survey of the terrain ahead, the drone 102 may locate a potential emergency situation and respond accordingly. Data may be returned dynamically or near real time by the drone 102 concerning the emergency. The vehicle 123 in some implementations may send instructions back to the drone 102 such that best use is made of the drone 102 concerning energy conservation, optimal maneuvering, and maximum recovery of relevant information that may be helpful in resolving the crisis. These wireless communications may transpire in some embodiments by switching between network types or networks to maintain optimal bandwidth in light of the urgency of a situation and the amount of energy used/to be used by the drone 102.

With reference to FIG. 1A, the user interface may include a drone control panel that may allow the driver to take manual control of the drone, such as in screen 104. In other instances, such as shown in FIG. 1B, screen 104 may describe a hiking track mode, which can be used by the occupants of the vehicle to set a timer or perform other tasks in an unknown terrain (or elsewhere) when the occupants set out for a hike. This embodiment is discussed in more detail, below. In some embodiments, a separate drone mode may be made to appear on a screen near the passenger side to enable control of the drone 102 by a passenger. The AI system run on the processing system may incorporate a Global Positioning System (GPS) receiver or other preexisting mapping systems and may display menu buttons that enable the driver/occupant to switch between automated versus manual drone control and to input criteria relevant to the target region in which the emergency situation may be located. Adjacent the drone control panel 104 is a screen indicating the mode of operation of the AI system. Screen 106 (FIG. 1A) shows that currently the system is in drone mode, meaning that the drone 102 has been deployed to survey a region of interest. The surveyed region or target region may vary widely depending on the circumstances of the vehicle 123. The target region may be ahead of the vehicle 123 if the drone 102 is analyzing the terrain for possible dangerous conditions or hazards. The target region may be in a location where persons may be lost or stranded. The target region may also be determined on the fly by the drone 102, independently or based on instructions from the processing system. The target region may be input or selected by the user via the user interface. The target region may be automatedly determined or approximated by the processing system based on various factors. The target region may be determined by a hiker, or by emergency personnel engaged to assist the hiker. The target region may be different in still other embodiments.

Referring back to FIG. 1B, the user interface further includes screen 108 that may provide indications or warnings about potential emergency situations including hazardous conditions ahead. In the example shown, screen 108 indicates that three miles ahead, the driver should expect to encounter a hilly road with highly saturated soil, along with a warning that these criteria may indicate the risk of moving rocks or a landslide, and other criteria. In other aspects (not shown), screen 108 or another screen may display the road temperature for the next five miles, along with illustrative maps and diagrams that show the user where the vehicle 123 is located relative to the surrounding terrain. The AI system may incorporate functionality from the GPS navigation system, which may work in tandem with the GPS system along with aerial scouting of the drone 102 and the use of vehicle sensors to provide the user with a diverse selection of information.

Screen 110 currently identifies other potential emergency situations detected by the drone, including a narrow passage bordering a cliff six miles ahead of the vehicle, along with suitable photos, videos, or warning icons. In some embodiments, the screens are dynamic and may change to show output displays, input selections, or a combination thereof. For example, the user interface at screen 110 is current acting as an output display, but it may also include links using icons or text. Thus screen 110 may be concurrently performing input and output functions. Thus, in other embodiments, screen 110 may include selections, links or icons enabling a user to provide instructions to the vehicle emergency system. In one embodiment, upon detecting a hazardous condition, the processing system may be configured to recommend to the user alternative routes based on information received from the drone 102 while scouting the target region. The user interface may illustrate various information about the alternative routes and may allow the user to select another route.

Referring to screen 112, the user interface may identify the presence of a body of water, such as the river seven miles ahead that is determined to be too deep for the vehicle to cross, or too dangerous to traverse due to a fast current, even if the water is sufficiently shallow. Example screen 114 includes a compass as well as a warning that five miles ahead of the vehicle, the drone has detected a wildfire that is burning 2.3 miles from the road. As with other displays, relevant information, warnings, and alternate routes may be provided. Screen 116 may identify the presence of rock climbers engaged adjacent the road, along with a warning to the driver to approach carefully to avoid accident or injury to the climbers or other nearby pedestrians. In short, the screens can monitor for, and provide warnings for, numerous hazardous conditions among multiple potentially dangerous situations.

As noted, the user interface need not in practice include this level of sophistication, as in many instances an automated voice may suffice, possibly along with a microphone to receive commands. Thus, the user interface may encompass a wide variety of technology, from a basic system to a highly integrated and sophisticated one. The screens in the examples of FIGS. 1A and 1B may advantageously include much information. As in other examples, a screen may indicate that the user has selected "route A" suggested by the system, given a choice between three routes A, B, and C. A screen may also show details about the various routes, including the elevation gain, the estimated time to traverse the route, etc. The screens may provide information about the current terrain, including text and illustrations with maps and details of the features in the immediate vicinity of the vehicle. Screens may show the upcoming terrain along with specific details received from the drone 102 about an emergency situation. For example, a screen may show photographs of a hazardous condition, as well as text and illustrations of various features in the upcoming terrain, along with additional information providing possible alternatives for the user to avoid identified features deemed to present a threat to the vehicle or its occupants. At another time, a screen may include energy management information relating to the amount of estimated charge or mileage the vehicle may have before the vehicle is expected to run out of power. The screen may also provide a notification that an alternative route has been selected by the user to avoid the emergency situation or hazardous condition(s) identified by the drone 102 during a survey. In various embodiments, each of the different screens may selectively provide the user with different input selections and output displays about an ongoing hazardous condition or the status of lost or stranded persons, such as hikers originating from the vehicle or otherwise.

The drone 102 may use one or more of its sensors (FIG. 4B) to detect dangerous road conditions ahead of the vehicle such as inoperable bridges, roads and trees that have been washed away, and other relevant obstructions. The data retrieved by the drone 102 may be communicated back to the vehicle's transceivers and, via the AI system and accompanying suite of application software, the data concerning the emergency situation may be transferred to the output display within the vehicle.

In some embodiments, the data provided by the drone 102 and transmitted to the vehicle 123 may include not merely the detection of potentially hazardous features and conditions, but also warnings of various types and relative levels of danger. Such warnings may be based on the drone's discovery of a hazardous condition, or the vehicle's discovery of such conditions after analyzing data received from the drone or data from the vehicle's own sensors. Examples of types of warning that may issue on the user interface include warnings based on dangerous slope, approach or departure angles, a narrow passage bordering a cliff at nighttime, foggy or rainy conditions, rocks or other moving or stationary obstacles that may cause the vehicle 123 to experience an external force event including a rollover, detection of fallen trees or road objects, depth of water in rivers or lakes, information regarding water currents, risks of landslide, and the like. Landslide risks may be determined based on the drone or the vehicle's assessment of data identifying areas of a mountain with highly saturated soil or moving rocks.

The warnings issued may be based on the vehicle's processing system using the AI system in some arrangements (such as where the processing capabilities of the vehicle are more sophisticated than that of the drone). The overall architecture of the drone-assisted vehicle emergency system may vary widely without departing from the scope of the disclosure.

The nature of warnings from the drone or as evaluated by the vehicle's processing system may be based on different considerations, including the terrain and road conditions that are detected in the target region that the vehicle is expected to enter, as well as the intended vehicular route and destination at the time of the warning. In some cases, the drone may be equipped with still or video cameras with optical and digital zoom capabilities. During different stages of the use of the emergency system, the vehicle 123 may be stationary or in motion, depending on the circumstances involved. In some configurations, the vehicle 123 may be configured to power up the processing system and other relevant systems used by the emergency features, such as at the occurrence of a trigger. The vehicle may also be prompted, by a user or by the drone, to issue instructions and guidance based on a potential emergency situation.

In other configurations, the drone-assisted vehicle emergency system may be used by first responders, paramedics, rangers, or law enforcement (in addition to consumers). The system may be particularly important for providing emergency assistance to hikers or lost individuals. In one such configuration, the system may be equipped with a timer, which may be set by the vehicle occupants as a measure to ensure timely return to the vehicle or to another secure destination (potentially with amenities, communications equipment, medical supplies, and the like). One of the vehicle occupants may set the timer for a certain time. Expiration of the timer may trigger the vehicle's AI system to launch and begin a search for the unreturned individuals. The drone's sensors in some cases may return data to the vehicle indicating that the person is lost or otherwise stranded. If the persons are mobile, the AI system may instruct the drone to follow the hiker, such as by initially hovering above the hiker, and perform controlled maneuvers to lead the hiker back to the vehicle or another suitable location with facilities to assist the hiker.

Where the lost hiker is found by the drone, the drone may provide periodic or continuous aerial views of the hiker to the vehicle for display in the vehicle. The aerial views and other data from the drone's sensors may be provided to a smartphone, smartwatch, or other handheld device in addition to the vehicle. Once the hiker/individuals have returned to the vehicle or are closing in on the destination, the vehicle's processing system may instruct the drone to return and land at the docking station to recharge and, where further emergency assistance or other activities are needed, the drone may redeploy. Accordingly, in these embodiments, an application may be available for download by one or more of the vehicle occupants, such as through a vehicle manufacturer's website prior to the excursion. The application may be downloaded onto a smartphone, smart watch, or other mobile device. The drone may include in its memory executable code that, when executed by the drone's controller, may establish a point-to-point data link (or other network connection) between the drone and the person in possession of the mobile device. The application may be used to facilitate communications between the drone and the person in distress or lost. Examples may include information-gathering queries from the drone to the lost person via the mobile device application, and providing instructions or directions (via a map, text, and/or other data content) to the lost person. The drone may gather this information from the lost or stranded person and relay relevant data to the vehicle 123, or maneuver to an area having cellular coverage to transmit a distress signal to emergency services including first responders, rangers, police officers, etc. The distress signal may include data characterizing the location of the lost or stranded persons along with photographs of the location, maps identifying the area and the location of the persons, and other data relating to the health and welfare of the lost or stranded persons.

In another implementation, an "ETA" (estimated time-of-arrival) algorithm may be used by the drone, vehicle, or some combination thereof. The algorithm may be used by the AI system to send the drone to the final hiking destination at a time determined by the ETA algorithm. The ETA algorithm may take into account a number of factors, including the expertise rating of the hiker(s) and average travel rate, etc. If the drone finds that the hiker is not at the destination when the drone arrives, the drone may, on its own accord or per instructions from the vehicle, begin a search for the missing hiker(s) in another target region starting from the anticipated destination and heading back toward the vehicle.

In other aspects, the drone-assisted vehicle emergency system may make use of a vehicle's proprietary emergency communication protocol. The number and sophistication of such systems, which may rely on dedicated satellite technology or terrestrial networks with proprietary frequencies, has increased in recent years. The AI-system may be configured to harness the power of its own proprietary emergency communications infrastructure to provide location information to first responders and other professionals. For example, if a hiker leaves his/her vehicle and becomes lost in an area lacking standard cellular coverage, the hiker may in these circumstances use an applicable smartphone application as described above to facilitate communicating with the drone or the vehicle. The application may have been previously downloaded and may be ready for use on proprietary technology (or smart watch, etc.). The application may enable the hiker to request a rescue mission. The request may be conveyed to the vehicle (or the drone), in which case the drone may be deployed to hover over the hiker and provide relevant guidance to enable the hiker to return to the vehicle or other point of origin. The occupants in the vehicle, if others are present, may be updated on the hiker's status via the AI system, which may receive status updates from the drone using its communication capabilities with the vehicle.

In other configurations, the hiker or other individual may not be mobile as a consequence of a health emergency, dehydration, fatigue, or other causes. When needed, the drone may be configured to fly to a higher altitude, and if needed to travel away from the region, to emit an emergency signal. The emergency signal, as noted, may be accompanied by data from the drone's sensors that includes pictures of the stranded persons and the pathways taken, along with other relevant data received at the drone from the sensors. In some arrangements, the vehicle's processing capabilities (assuming the vehicle is sufficiently nearby) may enable the vehicle to assess the energy requirements of the drone as part of the overall energy management system and to assist in overseeing the drone's successful return to the location of the stranded persons, as needed. In some cases, the drone may need to return to the vehicle to recharge or have its battery replaced. The drone may make multiple deployments under various circumstances to obtain additional data from its sensors to provide to emergency personnel with a more precise location of the stranded persons if the location has not yet been established with sufficient precision. In other configurations, the drone may be equipped to perform these energy assessment evaluations (such as assessing its remaining range based on its charge) on its own, thereby providing the data to emergency medical or rescue personnel closer to real time than if the drone unnecessarily docks and redeploys.

Aspects of the disclosure further include systems and methods for drone-based management of potential emergency situations. In the aspects to follow, an aerial drone may be associated as a client or slave in a client-server or master-slave system with a vehicle. The drone may have a unique numerical or alphanumeric character string assigned to it that qualifies as an identifier uniquely used by the vehicle for controlling the drone as a client. In this example, the vehicle acts as a server. Configurations of the disclosure leverage the benefits of sensors implemented in aerial drones. These sensors include, but are not limited to cameras, sonar devices, radar systems, lidar systems, thermal devices/thermometers/temperature measurement devices, night vision equipment, acoustic sensors (e.g., to record the voice of a stranded person and convey the data to the vehicle for further analysis by the processing system) and other sensors equipped with the drone and capable of being engaged, selectively or continuously, to receive input data while the drone is in the process of scouting a target region, whether in response to instructions from the vehicle or upon the drone's own recognition of a potential emergency situation.

In various aspects, input data collected by these and other sensors from the drone may be transmitted back to the vehicle, in or near real time while the drone is in flight, or after the drone has returned and docked with the vehicle using a plurality of possible docking configurations. The vehicle's processing system may evaluate data received from the drone, including input data from the drone sensors. The input data from the drone sensors may be supplemented with other input data from one or more vehicle sensors. For example, in various aspects, the processing system in the vehicle is configured to combine the input data received from the drone sensors with the input data received from the vehicle sensors, to select the most relevant data from both sources (e.g., input data from at least one or some of the drone sensors together with input data from at least one or some of the vehicle sensors) to ultimately determine optimal vehicle routes and other suitable remedial responses for enabling the driver to negotiate the upcoming terrain using the desired route. The processing system may also use the global positioning system (GPS) navigation features along with other preexisting features germane to the target region to determine the presence and location of hazardous conditions as described herein.

The principles of the disclosure find particular utility in regions where the levels of detail regarding topographic conditions is not widely understood, or changes over time. Examples of topographic features for the purposes of this disclosure include new or previously unknown routes where the desired level of detail may be dynamically created by the drone-based vehicle routing system. Dangerous conditions may abound in these regions. These types of regions often include new dimensions like natural obstacles (trees, rocks, rivers, obstacles in general elevation, and the like). Thus, the AI system may be widely advantageous for use in more natural environments that are typically not contemplated in today's crowd sourcing or navigation databases.

Nevertheless, it is often the case that such natural or less familiar regions are closely adjacent—and sometimes within—much more populous regions that include roads, structures, and other elements of modern civilization. Therefore, it should be understood for purposes of this disclosure that target region is intended to specifically include and encompass areas including both natural and artificial features of a terrain in whatever form. For example, for purposes of this disclosure, the target region may include both offroad means of navigation and pre-existing routes and pathways, including without limitation roads, paths, or other routes (e.g., as defined by a full width road or mere parallel tire tracks), whether paved, dirt, gravel or otherwise. Further, while aspects of the disclosure are directed to offroad vehicular navigation in an offroad area or an offroad target region, the use of the terminology "offroad" does not exclude the presence of roads, buildings, and other artificial structures within the offroad area or offroad region. For example, a present location of a vehicle may be a paved road. An offroad area or region qualifies as offroad for purposes of this disclosure where a part or each of at least one of the possible routes from a present location to a destination is offroad for even a short distance.

As one example, hazardous conditions may be identified by a drone upon the drone using its sensor set to evaluate, without limitation, data relevant to terrain; vegetation canopies; inclination at different regions; approach or departure angles; slope angle; natural or artificial obstacles; temperature; pavement types; rivers, lakes or bodies of water or conditions thereof; presence or location of social media members (in an off-roading club, for example); distances; path widths; road widths, and geographical or geometrical measurements of whatever nature. In various configurations, the vehicle is further equipped with sensors so that input data may be received and analyzed by the vehicle's processing system along with the data received from the drone. The drone's aerial view accords it an advantage with respect to acquiring or sensing input data from various altitudes above a target region (which may broadly be a predetermined region stored in a memory coupled to the processing system, coordinates or equivalent mapping information provided by the driver or other occupant via a user interface, or otherwise).

In further aspects, vehicle telematics, including sensors and related infrastructures that assess driving performance, driving styles, speed management, handling of turns, reaction times, and many other instances of driver conduct when the vehicle is in motion may be used by the processor to score driver ability. The vehicle may use its combined array of terrestrial and aerial sensors available to assess route complexity in view of the determined ability of a driver. With this information, the requirements for different routes may be determined and conveyed to the driver.

In other aspects, less dangerous offroad routes may be recommended based on a vehicle's capabilities, such as climbing capability, range, speed, maneuvering capabilities, and the like. These recommendations may include combinations of vehicle capabilities and driver capabilities and/or driver skill level. The processing system may be configured to make overall recommendations based on these and other criteria, with the goal of enabling the vehicle to avert a potentially dangerous situation.

The vehicle may engage the drone using a suitable communication technique to create a data link for the mutual exchange of data and instructions between the vehicle and drone. The data link may use Bluetooth™, available cellular and mobile broadband networks, 3G, 4G, and 5G networks, point to point wireless networks, and a host of other proprietary or publicly familiar communication protocols may be used to set up a communication link. In this disclosure, the terms "wireless link," "communication link," "data link," and related terms as clear from the context refers to (1) a way for the drone and vehicle to communicate wirelessly, or (2) where relevant, a way for the drone to communicate with one or more lost or stranded persons. These terms are broadly intended to encompass configurations in which the drone transmits information to the vehicle and/or the vehicle transmits information to the drone. These terms are further relevant in various embodiments to communication exchanges between the drone and a lost or stranded person. For example, a link may broadly encompass a plurality of transmissions from either device over a period of time, a single instruction, or anything in between. The data link need not be a duplex link. In various configurations, the vehicle's powerful processing capability may make it a better candidate to be a master or server in a master-slave or client-server relationship. For purposes of this disclosure, either entity (the drone or the vehicle) may establish the data link or similar network connection.

As noted above, in one aspect of the disclosure, the offroad solution enables the vehicle-drone combination to collect data using sensors from both the drone and the vehicle, and to detect and characterize optimal vehicle paths for display on an output display device in the vehicle. In other aspects of the disclosure, the drone-based vehicle-routing system may further be used for energy management. In the example case of an electric vehicle (EV), the driver may be off-roading and may elect to make better decisions by being informed in advance with information coming from the drone many miles ahead relative to the vehicle's estimated range remaining after facing obstacles, inclinations, distances, and potentially other factors associated with taking one of the identified offroad routes. The driver may need assistance in determining whether the EV will be left with a sufficient range to travel back home, or to a charger. The present configurations may use the sensor data to quantify these estimations in a more precise and robust manner. For example, the aerial scouting by the drone may provide the vehicle with much more relevant data in advance by flying many miles ahead of the vehicle and providing comprehensive information relating to the obstacles, and estimated time for the driver to overcome, inclines, elevations, and other hazards that may have a profound effect on energy consumption of the EV, versus more straightforward paths that may currently be obscured from view (e.g., due to mountains or trees in the terrain). In these configurations, the processing system need not simply make such estimations of range based on distances and limited information. Rather, the processing system may be able to retrieve significant amounts of data characterizing the routes that enables estimated ranges to be determined with far greater precision. These advantages of energy management apply equally in hiking situations and other activities involving the drive and vehicle occupants. The drone-assisted vehicle emergency system may use this energy management information to avoid an emergency based on the vehicle becoming immobilized due to insufficient power or gasoline, and therefore stranded.

Figure 2:
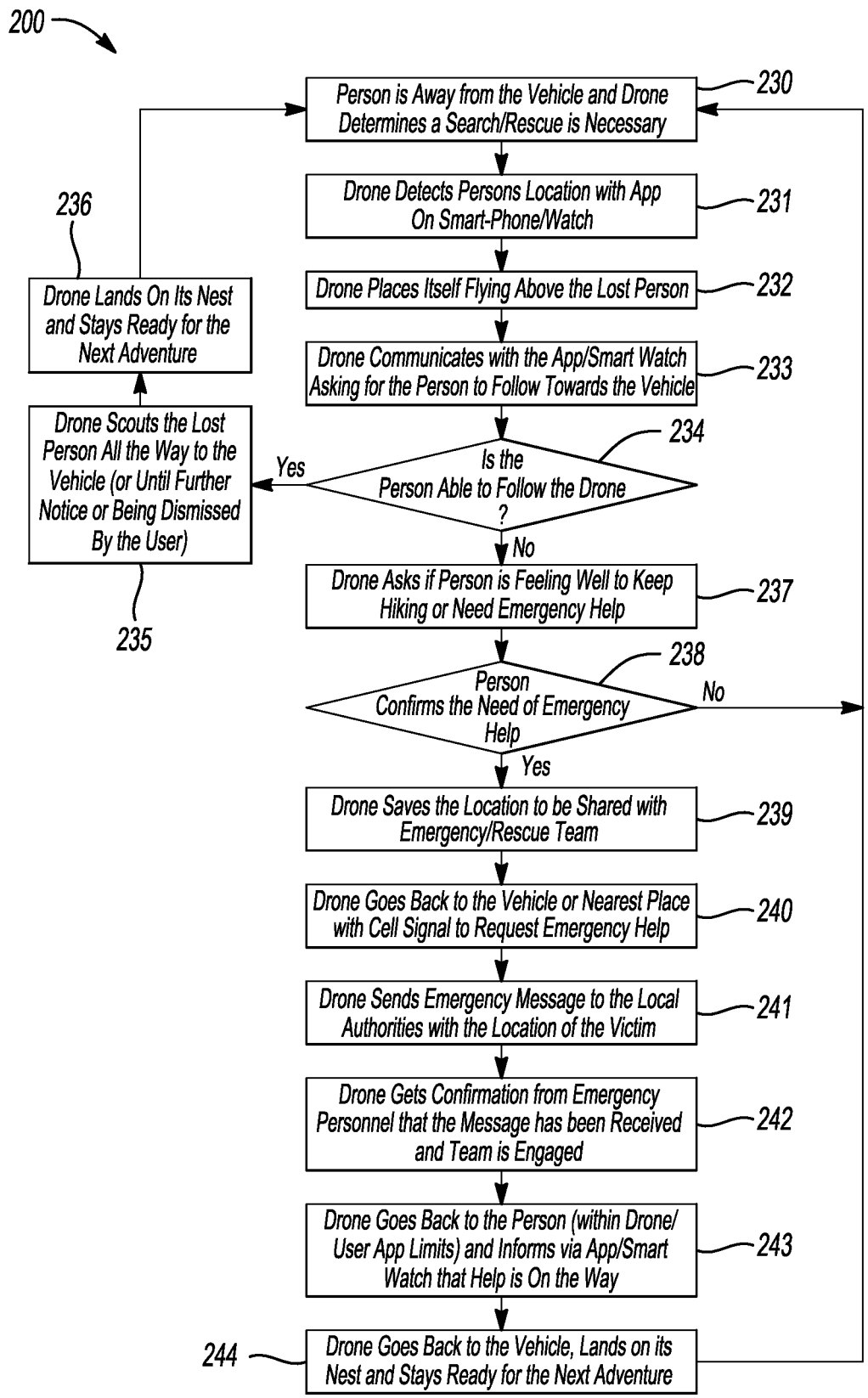
FIG. 2 is a flow diagram illustrating an exemplary method of a drone deployed to provide emergency assistance to a lost or stranded person.

FIG. 2 is a flow diagram 200 illustrating an exemplary method of a drone deployed to provide emergency assistance to a lost or stranded person. Upon deployment, the drone may survey a region, locate a lost or stranded person, and communicate with the person using a mobile device on the person to aid in providing guidance or other assistance to the person. The method described in FIG. 2 may be performed by the drone and its sensors, the vehicle and the processing system therein, and in some embodiments, a mobile device or smartwatch as a result of a device download. In various embodiments, the drone may be configured to locate an individual such as a hiker that went out for a hike and became lost. In some cases, the hiker or other person may have a mobile device along with sufficient cellular coverage. The hiker may use the mobile device (e.g., a smartphone) to help find the way back to the vehicle or other refuge. The hiker may also request the drone to deploy using a cell phone or another application on a smartphone or smart watch, as described above. The drone may deploy and locate the hiker, and may hover over the hiker and initiate maneuvers to assist the hiker back to the vehicle, point of origin, etc. During the guidance back to refuge, the drone may exchange communications with the vehicle about the condition of the hiker, the best route for the hiker to take to the vehicle, and similar considerations.

Referring initially to step 230, the driver or other occupant is away from the vehicle. Based on a trigger to the processing system, data evaluated by the processing system, or another criterion set by a user or automatedly by the processing system, or based on a determination made by the drone, the drone determines that a search and possible rescue are needed. Accordingly, the drone may deploy if not already deployed and search a target region. The target region may, for example, be a region determined by the drone, the processing system or a user that is more likely than other regions to include the lost or stranded person. The drone may accordingly engage its sensors to begin its search for the missing individuals.

In additional examples of step 230, the lost person (or another person) may have set a timer at the vehicle to instruct the drone to begin the search upon expiration of the timer. The person may in other cases instruct the drone to regularly (subject to power constraints) follow the person and provide aerial views to the person's smartphone or smart watch via an application familiar to the drone. In this latter case, the drone may return when needed to perform a recharge and then redeploy to the person's location. In another configuration, the user may program the processing system to send the drone to the final hiking destination at a time determined by the ETA algorithm. This assessment may incorporate the skill level of the hiker, average travel rate, and other considerations. If the hiker/person is not at the expected location, the drone may retrace its flight to start searching backwards for the missing person toward the vehicle.

As noted, in some cases where cellular coverage is not available, the processing system or drone may be able to communicate with the person via the application using a proprietary network. For example, the vehicle manufacturer may include an emergency channel for lost or missing persons.

Thereupon, at step 231, the drone may locate the person. If the person is a user of the application on her/his smartphone or other mobile device, the application may include location technology that emits periodic transmissions. The drone in other embodiments may initiate contact, to which the application may respond, automatically or via the user's selection of an input on the mobile device or smart watch. At step 232, the drone may maneuver to the located person and fly or hover above the person. At step 233, the drone may proceed to exchange communications with the user via the application. For example, the drone may text messages to the user's application that the user may respond to with text or voice. In other embodiments, the drone may use artificial intelligence via code in its controller (FIG. 4B) along with a transmitter to provide a computerized voice asking the person questions about the person's current state of health (whether the person needs medical attention, is dehydrated or exhausted, etc.). In this embodiment, at step 234, the drone issues a query (text or otherwise) asking the person whether he/she is able to follow the drone on foot.

If the person responds affirmatively, the drone may proceed to acknowledge the person's response and briefly provide instructions to the person that the drone will accompany the person to the vehicle. In step 235, the drone proceeds to scout the lost person on the way back to the vehicle (or other point of origin or place of refuge, or the like), until further notice is given to the person or being dismissed by the person. One example of such "further notice" is when the drone needs to recharge before returning to complete the guiding maneuver.

In step 236, upon successfully guiding the person back to the security of the vehicle, the drone lands on its docking station or nest, ready for the next emergency call or other survey mission. Control thereafter may return to step 230.

If the person instead responds to the request at step 234 that she/he is not able to follow the drone on foot back to the vehicle, then at step 237, the drone may issue a query to the person asking the person if he/she is feeling well enough to continue the hike, or instead if he/she needs emergency assistance. In this example, upon receiving a response from the person, the hiker proceeds to confirm at step 238 that the person is in need of emergency help. If the person responds affirmatively (or is unresponsive and appears hurt), the drone saves in memory the location of the stranded person at step 239. The drone may take photographs or video footage of the stranded person. The drone may also gain altitude to take additional photographs of the area, and to use its other sensors as appropriate to help ensure that the location is determined as precisely as possible. One purpose of the data-gathering is to provide an anticipated emergency/rescue team with as much relevant data as possible to enable responders to succeed in rescuing the person.

At step 240, the drone may maneuver back to the vehicle or closest place with cellular reception to relay the request for emergency help. The drone at step 241 may send an emergency message to the local authorities. The data sent may include the location of the victim and, in some embodiments, pertinent information about the terrain. The data may also include different types of information gathered about the condition of the victim. At step 242, the drone may receive confirmation from emergency personnel that the message sent by the drone has in fact been received and the team is being prepared or is engaging. The drone, having received an acknowledgement from emergency personnel, may return to the person at step 243 to inform the person that assistance is forthcoming. These activities may be subject to the practical limitations of the drone, the network connections (if available), and the application on the person's mobile device. For example, the mobile device may in some circumstances just be sophisticated enough to allow for short responses (such as yes or no). The drone may then return to the vehicle to land on its nest, at step 244.

Figure 3B:
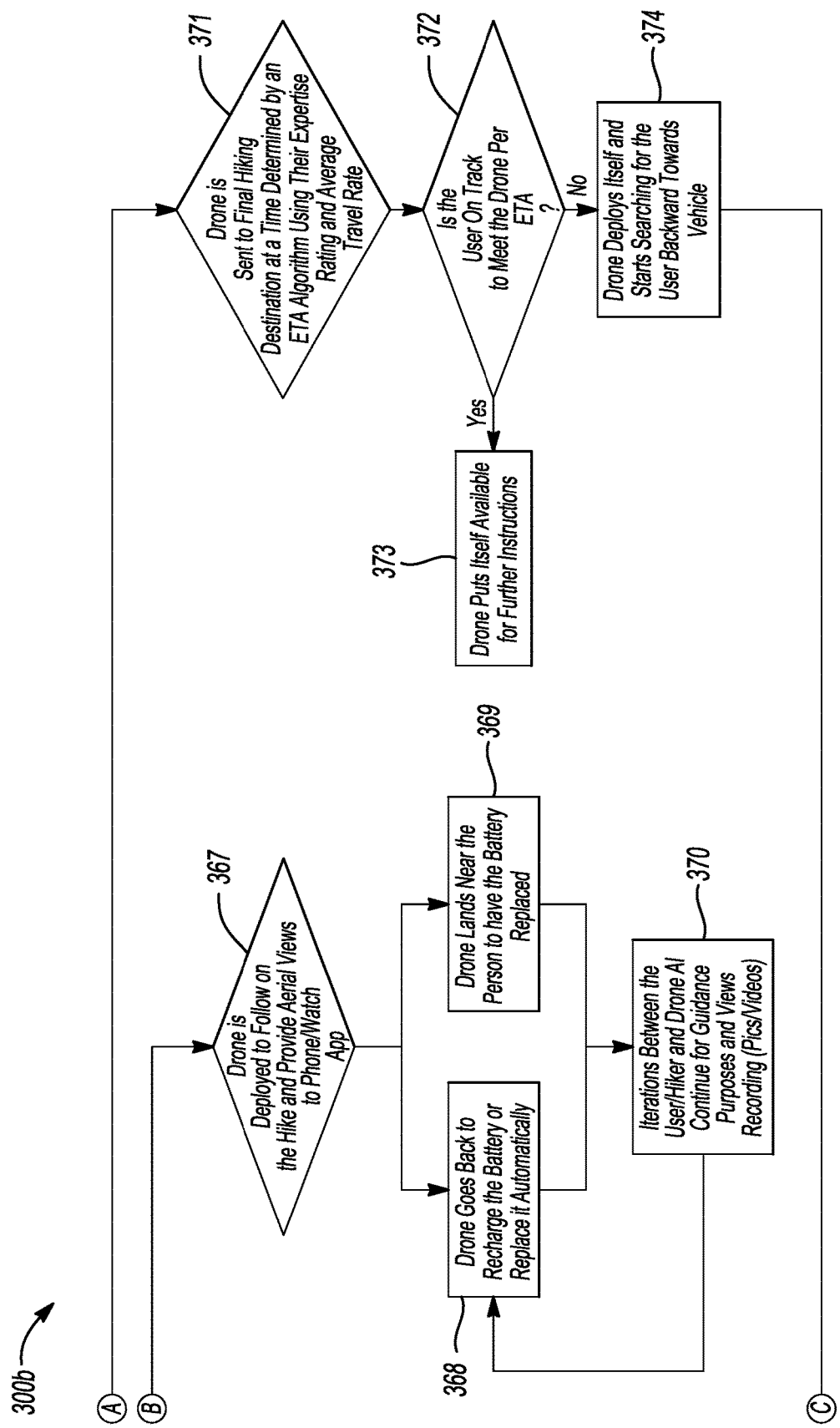

FIGS. 3A and 3B are flow diagrams 300a and 300b illustrating an exemplary method of a vehicle deploying a drone to provide assistance to a lost or stranded person, in accordance with another embodiment. Referring to step 351, the drone may initially be nested at the vehicle, such as resting on the docking station. While the processes in FIGS. 3A and 3B may refer to the driver as an example, the processes may equally apply to persons other than the driver. At step 352, the driver is away from the vehicle. The driver may be lost and unable to return to the vehicle. The driver may send a command for the drone to be deployed. At step 353, the drone may detect the user's location using the application on a smart watch. As in the above examples, the application may include code specifically configured to interface with the communications system on the drone.

The drone may relay the communication to the vehicle to trigger the processing system to respond to the potential emergency situation. At step 354, the drone may travel to the location of the person. In this embodiment, the drone may use the location of the person based on a transmission from the smart watch. In other embodiments, the drone may receive assistance from the vehicle's processing system which may provide a location (e.g., as input previously by a user of the system) or an estimated location. In either event, upon traveling to the location of the person, the drone maneuvers to a location above the lost driver. Depending on the maneuvering capabilities of the drone, which may differ in various configurations, the drone may position itself closely to the driver to communicate effectively with the driver over a network (e.g., Wi-Fi, cellular, or a proprietary network associated with the emergency system). In some embodiments, the communications may be performed using a recording device in conjunction with voice recognition technology aboard the drone (in some cases, with assistance from the vehicle, which may additionally or alternatively include voice recognition capability).

At step 355, the drone may proceed to communicate with the driver or other user via the mobile device. For example, the drone may ask the person to follow the drone in the direction of the vehicle. As in previous embodiments, the drone may specifically query the driver or other individual at step 356 whether the driver is in fact capable of following, or is willing to follow, the drone. If the driver responds affirmatively using the response feature built into the application on the mobile device, then at step 357, the drone guides the driver and accompanies the driver on the way back to the vehicle. As before, the following step may be terminated if notice is provided (e.g., refuel/recharge requirements of the drone) or if the driver/user terminates the procedure via the application software. Otherwise, at step 358 the drone returns to its dock. In this embodiment, control may return to step 352 to address other users or another driver adventure.

If, similar to prior embodiments, the driver is unable to follow the drone (step 359) and responds to the drone with this information after a query from the drone, the drone may confirm the need for emergency assistance at step 360. In some embodiments, this confirmation may entail communicating with the vehicle such that the processing system is updated on the current situation. The processing system, upon receiving a prompt from the drone, may confirm that emergency assistance is needed. In some cases, the vehicle may initiate this process. In the embodiment shown, at step 361, the drone saves the relevant data recording the location of the stranded driver at step 361. The drone in some embodiments returns to the vehicle at step 362, such as in cases where the drone needs recharging, or the vehicle includes a network connection for use in alerting authorities to the emergency situation. In some embodiments, the drone may immediately maneuver to the closest region it may find that includes cellular coverage. At step 363, as before, the drone sends an emergency message to a designated recipient of the entity in control of such emergency situations, or directly to emergency services. The drone may receive confirmation of the emergency message from emergency services at step 364.

Having transmitted the emergency signal along with relevant data pertaining to the lost or stranded driver or other individual, the drone may return from the area with cellular coverage back to the driver at step 365. Upon the drone's return to the immediate vicinity of the person, the drone reports to the person via the application that emergency services have been notified and that assistance is engaging to initiate a rescue. At step 366, the drone returns to its point of origin and recharges for the next potential emergency situation.

The example procedure outlined in FIG. 3A may be closely similar to the procedure of FIG. 2. However, the example of FIGS. 3A-B shows a drone with more sophisticated options and capabilities. Referring again briefly to FIG. 3A, the drone is parked at the vehicle at step 351, such as resting on a docking station with a full charge. Referring to the "B" designation and following the designation to FIG. 3B, a different mode of action has been selected. For example, a hiker/driver of the vehicle, prior to the hike, may use the user interface (FIG. 1A) to input a desired selection into the AI system. At step 367, following a prompt from the processing system and after a brief evaluation confirming the details of the present situation by the processing system, the drone may be deployed to follow the hiker on the hike in real time and to provide aerial views to the hiker via the application on the hiker's smart watch or smartphone, or another mobile device. These aerial views may be relayed to the vehicle in some embodiments to enable the processing system to integrate and order the views and append relevant text based on data from the drone's sensors. In other embodiments, the drone performs at least some of the aforementioned activities independently, without assistance from the vehicle.

For example, the drone may deploy immediately following a simple instruction issued to it by the processing system or directly from the application on the hiker's mobile device. Referring further to FIG. 3B, the drone may continue to follow the hiker, in some cases acquiring relevant sensor data and saving the data in memory or periodically reporting the data to the vehicle. At step 368, it is assumed that the drone's power runs low at some point, in which case the drone may return to the docking station to recharge or have its battery replaced automatically, using specialized hardware and as supervised by the processing system. In other embodiments, at step 369, the drone lands near the hiker/user to have its battery replaced. In this example, the hiker may bring batteries on his/her person. The application on the mobile device may include functionality for coordinating battery replacements. The drone may land adjacent the hiker and shut down. After replacing the battery, the hiker may request that the drone redeploy, such as by using an input selection mechanism on the drone or by selecting the appropriate option on a menu in the application.

At step 370, the iterations between the hiker and AI system executing on the drone's controller (FIG. 4) may continue as needed. Thus, the drone may deploy, land, and redeploy when a recharge or a new battery is needed. The drone in these embodiments may be equipped, much like the vehicle, with AI software while it proceeds to take aerial photos and survey the region. In some configurations, the drone may issue warnings to the hiker in real time where the drone identifies a potentially hazardous condition. These warnings may be accompanied or followed by suggestions for rerouting the hiker such that the hazardous condition is circumvented. In other embodiments, the drone may periodically contact the vehicle to enable the processing system to perform AI analyses on the data and to provide supplemental instructions to the drone as it proceeds to guide the hiker through the hike. The drone may also be equipped with a video camera to take video of the hiker, both for use by the AI systems and for personal use of the hiker to memorialize the hiker's accomplishments and/or the beauty of the aerial views.

With continued reference to FIGS. 3A and 3B, and in particular referring to the letter "A" leading from step 351 of FIG. 3A, another drone embodiment is illustrated. As with the previous examples, the vehicle's AI system may in various configurations be updated and used to provide more detailed analyses. In the embodiment shown, the drone has more autonomy to make decisions as it analyzes the data received at the controller from the data sensors. Referring again to FIG. 3B, at step 371, the ETA algorithm feature may be employed. This feature may in some cases be employed in advance by the user of the system. In such cases, the user may select the ETA algorithm using an input selection displayed on the user interface. The ETA algorithm may be used as a routine measure to assist the user by meeting with the user/hiker at a final hiking destination at a time determined by the algorithm. In various embodiments, the processing system at the vehicle may illustrate selections at the user interface (which selections may also be hardwired actuators rather than touch panel technology) enabling the user to enter information relevant to the user's hiking/climbing abilities and skill level. The processing system may provide a plurality of prompts for the user to input the user's historical experience on the intended route or on related hiking routes of a given difficulty level. From this information, the processing system may determine the user's average travel rate. In other embodiments, the user may enter his/her travel rate information directly.

The ETA algorithm may include executable code capable of artificial intelligence as it specifically relates to off-roading activities. These features and capabilities may include hiking and climbing activities. The drone and vehicle may memorialize the hiker's historic times of arrival from prior excursions based on the perceived level of difficulty of the hiker negotiating the terrain, e.g., based on data gathered by the drone's sensors. The processing system and drone may use this historical technology to make predictions about the hiker's ETA at the location set by the hiker. In some embodiments, the ETA algorithm, while not specifically actuated by the user, may be nonetheless available when the processing system is triggered to respond to a potential emergency situation involving a lost or stranded person. The final destination of the hiker may be determined or estimated, if not otherwise pre-established, based on existing metrics or a generated baseline established by the processing system.

Thus, as the ETA algorithm makes its determination, the processing system may instruct the drone to fly to the final destination to meet with the hiker. In some examples, such as at step 372, the processing system or drone may analyze the data to inquire whether the user is on track to meet the drone per the ETA. This analysis may be conducted using historical data together with data gathered by the drone during periodic surveys, if available. If the processing system or drone determines that the user is on track to meet the drone, the drone may proceed as above to the destination location to interface with the hiker. Once the drone arrives, the drone may determine the hiker's condition and to inquire, via the mobile application, whether the hiker needs assistance. This information may be relayed back to the vehicle. At step 373, the drone may position itself on the landing pad and recharge pending receipt of further instructions.

At step 374, if the drone deploys itself based on its independent execution of an ETA algorithm (as one example), the drone may determine that the hiker is not present at the destination location. Accordingly, the drone may begin searching for the hiker, starting from the location and proceeding in a direction toward the vehicle. As shown by the designation "C", and referring back to FIG. 3A, the drone at step 354 may find the hiker. The drone thereafter places itself in a position above the hiker. Control then proceeds to steps 355 et al. in FIG. 3A as the drone interfaces with the hiker via the application on the mobile device. Certain embodiments of these steps are described above.

FIG. 4A is a block diagram 400a illustrating a processing system 405 and related elements of a vehicle 123 for executing code for providing emergency assistance in accordance with embodiments of the disclosure. FIG. 4B is a block diagram 400b illustrating hardware components of a drone 102 used to assist the processing system 405 in providing emergency assistance, or to act independently to provide emergency assistance.

The processing system 405 includes processor 404, which may be at a central location (such as in an electronic control unit), or which in other embodiments may be distributed at different locations within the vehicle. Processor 404 may be used to control the AI system. The processor 404 may in some arrangements include more than one processor. Processor 404 may include one or more central processing units. The functions performed by processor 404 may be performed in software, hardware, firmware, middleware, or a combination thereof. The processor 404 may execute algorithms on one or more layers. Thus, the processor 404 itself may vary widely in its architecture. In vehicle implementations, the processor 404 may be deemed for purposes of this disclosure to include the hardware (including without limitation one or more Electronic Control Units (ECUs)) used to execute the vehicle functions described herein. For example, the processor 404 may include one or more general purpose processors, special purpose processors, complex instruction set computer (CISC) processors, reduced instruction set computer (RISC) processors, and/or other types of processors. Processor 404 may include multiple processors, whether homogenous or heterogenous, dispersed throughout the vehicle and used for receiving vehicle sensor data and performing the computations needed to implement the vehicular side of the drone-based routing system. Each of the processors included as part of processor 404 may include different numbers of cores (one and greater) and may include cache memory, busses, registers, and other similar processor components. In other cases, some or each of the functions of processor 404 may be performed in hardware. Thus, in some exemplary aspects, processor 404 may include one or more digital signal processors (DSPs). systems-on-a-chip (SoCs), field programmable gate arrays (FPGAs), application-specific integrated circuits (ASICs), dedicated logic circuits, combinational or other hardware circuits for implementing functions in hardware, CPU(s) for executing code, or some combination thereof. As noted above, if some or each of the functions of processor 404 are performed in software, the software may include or involve middleware, firmware, application programming interfaces or other types of code. In some embodiments, processor 404 is part of a separate computing device embedded within vehicle 123, whether on its own or used in tandem with one or more other embedded computing devices. The processor 404 may also include one or more computing devices (in some cases using an internal vehicle network) for performing the above-described algorithms, in hardware or software.

Referring still to FIG. 4A, processor 404 may include an input coupled to a crystal oscillator or similar stable clock signal. In some embodiments, the clock information may be internal to the processor 404. The processor 404 may be programmed to perform a function periodically on a specific time and date, or after passage of a specified time period. The processor in these embodiments has accurate timing information in its possession and may perform the specified function accordingly.

The processor 404 may be coupled via bus 424 to a memory 408. Memory 408 may be multiple vehicle memory devices for storing, pre-storing, and dynamically adding or modifying data for use with the different applications identified in this disclosure, including to analyze the data, following an internal or external trigger, for determining whether a potential emergency situation exists. The processor 404 may include cache memory stored within the processor itself, although in other embodiments, additional cache memory may be physically separate from the processor. The memory 408 may include different forms of computer-readable media including, but not limited to and by way of example, solid state memory, flash memory, magnetic or other hard disk drives, and physical memory implementations in whatever form. Memory 408 may include different memory architectures including but not limited to read-only memory (ROM), random access memory (RAM), static RAM dynamic RAM, cache memory, and the like. Information calculated by processor 404 may be stored, temporarily or permanently for future use. Memory 408 may include the data repository and databases described herein, for storing AI and self-learned acquired data, for providing data to the processor 404 over bus 424 to enable calculations, and for storing data in the remaining contexts that may be needed to implement the vehicle architecture. Memory 408 may also be used to store input data received from the drone, via the data link. The processor 404 (or the controller 403 of the drone) may continually update the database repository(ies) in memory 408 with new and/or substituted information.

The vehicle 123 may further include vehicle sensors 410. These vehicle sensors may include sensors that compute vehicle range, information about the height of the vehicle base above the ground, in light of the tire pressure, and a host of other navigational sensors, including rear-view cameras, side-obstacle warning systems, side and front view cameras in some cases, and the like. More sophisticated off-roading vehicles may include ground-based radar, lidar, sonar systems, and other sensing equipment. Sensors may also include accelerometers, odometers, speedometers, gyroscopes, and other sensors that may be relevant to driver experience and the ability of the vehicle to continue free of material mechanical problems. The processor 404 may make determinations based on vehicle data as to whether the vehicle is capable of continuing on the offroad excursion, or whether, for example, a problem is detected that may affect the success of the trip.

Bus 424 may include a single physical link, or a plurality of physical links between the various devices within vehicle 123.

The vehicle 123 further includes an output display 406 (e.g., an infotainment display). This output display 406 may be incorporated within screens 104, 106, 108, 110, 112, 114 and 116 that constitute the user interface. Commonly, the output displays may include an input touchpad so that the user may make selections by touching illustrations also used as input. Thus, the vehicle 123 includes a user interface 414, such as drone control panels 104 and other touchscreens that provide illustrative links and icons for the user to select to successfully operate the AI system. User interface 414 may also include dedicated output displays 406 that enable the user to depress areas with certain text or illustrations (e.g., in rectangular boxes), as is commonly used in tablet personal computers (PCs) or smart phones. The user interface 414 in one configuration may include the input controls/buttons within the vehicle that enables the driver/user to make full use of the drone-based system. Similarly, the output display 406, which may include one or more display screens, may include the output for displaying data sufficient for the driver/user to make use of the drone-based system. Using the visual and textual cues on the user interface 414 and output display 406, a vehicle occupant may monitor the progress of an ongoing attempt to resolve a potential emergency situation involving a lost or stranded person. Where the user is the driver, the driver may operate the system via the user interface 414 and receive information such as warnings and recommendations related to hazardous conditions.

The vehicle sensors 410 as described above may also include the sensors in the vehicle including cameras, motion detectors, radars, lidar, and other available sensor types, present now or forthcoming, that enable a robust ground-based data emergency response system. Using the vehicle sensors 410, the processor 404 may receive input data required or helpful for the drone-based vehicle routing system to display warnings, alternative routes, energy management, and the like in a precise and feature-rich interface.

The vehicle 123 also includes a transceiver 420, which may include one or more circuit devices for use by the processor 404 in sending data to the drone and receiving data from the drone 102. The transceiver 420 may be used by the processor 404 to establish a data or communication link 448 between the vehicle and the drone. The processor 404 may use transceiver 420 to transmit, via one or more antennas 422 the data from the repositories and databases in memory 408 (which again may include multiple memories) to the drone, as appropriate under the circumstances. The processor 404 may communicate this and other information over bus 424. In some configurations, the transceiver 420 may include multiple components, such as a separate transmitter and associated circuitry, and a separate receiver and associated circuitry. Transceiver 420 may also be partitioned into a plurality of circuit components that are configured to execute multiple network protocols, and multiple layers of the protocols. Processor 404 may receive information from the transceiver 420 over bus 424 and execute operations on data over different abstraction layers. The antenna 422 may be a single antenna, a plurality of antennas, or an antenna array (e.g., the latter for performing antenna steering and other more sophisticated transmission techniques). For clarification and simplicity, the data link 448 is deemed for purposes of this disclosure to generally reference the signals transmitted from each of the antennas, if more than one exist.

The transceiver 420 may also include dedicated hardware or software for enabling the processing system of the vehicle to initiate and receive contact with an emergency network or emergency channel that may be proprietary to the vehicle manufacturer, contracted by the vehicle manufacture, or otherwise available to consumers and purchasers of the vehicle with the emergency-assistance technology. For example, the transceiver 420 may include functionality for relaying emergency requests to a satellite system or to an independent terrestrial network, for example. In still other embodiments, the transceiver 420 may be configured to exchange data communications between the vehicle and mobile devices that include authorized application software, including smartphones and smart watches that may be in the possession of occupants that departed the vehicle on foot.

The processing system 405 may also include docking hardware 427. This docking hardware may include a docking station that may be coupled in a wired or wireless fashion to data link 448. This docking hardware 427 may also include a charger, in the case of an electric-powered drone, to charge the drone using energy from the vehicle or the vehicle's battery cells or generator, or a dedicated battery (or set of battery cells) or generator within the vehicle 123. In practice, the docking hardware 427 may include a docking station on the roof or in the rear of the vehicle, such that the drone 102 is secured snugly when the vehicle is in motion, and may be unlatched (in some cases, automatically) when instructed to fly. In some configurations, the docking hardware 427 includes a horizontal platform in the back of the vehicle 123 below the vehicle roof such that the drone places negligible drag on the vehicle 123 when the latter is in motion, and such that the interior of the vehicle remains available for luggage and other items. In practice, a large number of types of docking hardware 427 may be implemented for hitching the drone 102 to the vehicle 123.

FIG. 4B is a block diagram of an example processing system in an aerial drone 102. The drone 102 includes a controller 403, so named to distinguish it from the processor 404 and associated processing system 405 equipped with the vehicle 123. That said, controller 403 may, similar to processor 404, include a plurality of processors, the totality of which is referred to as a controller to execute the aerial scout and emergency assistance functions including to maneuver the drone 102 (on its own or with the guidance of the drone-based system or a user with the mobile device hiking on foot, for instance), and to receive input data from the one or more drone sensors 429. The controller 403 may in some aspects perform sophisticated assessments of the received data from one or more drone sensors 429 and may make determinations based on the drone sensors 429.

The controller 403 is further equipped with a transceiver 477. Transceiver 477 may, like the vehicle transceiver 420, be partitioned into a separate transmitter and receiver, or it may be a single unit to preserve real estate on the drone 102. Controller 403 may use transceiver 477 to send and receive data and instructions over the data link using antenna 440. Antenna 440 may be a plurality of antennas an array of antennas like in the vehicle 123. Transceiver 477 may be configured to work seamlessly with one or more prescribed wireless network technologies as described above with respect to the vehicle 123. Transceiver 477 may also include functionality for exchanging data with the mobile device applications for providing emergency assistance or guidance to a hiker or lost or stranded person. Transceiver 477 may further include hardware and one or more antennas 440 for transmitting a long range emergency distress signal over a dedicated channel, as described in embodiments above. Transceivers 477/420 may also be configured to transfer wire over a hardwired data link when the drone 102 is docked using docking hardware 427 (FIG. 4A).

Referring still to FIG. 4B, the drone 102 may further include a memory 407, which may have the same features as the memory 408 described above with reference to the vehicle 123. The memory 407 may include an operating system that supports flight control and that includes an application programming interface (API) that may be used by the vehicle-based applications. In some cases, the controller 403 may also include swappable or permanent flash memory 409. Where the drone 102 is powered by electricity, the controller 403 may include a battery 413. The battery 413 may be a battery cell or plurality of rechargeable cells. The drone 102 may be charged when docked with the vehicle's docking hardware 427.

The drone 102 also may include an aerial control system 415. In some arrangements, aerial control system 415 is part of controller 403, whether or not it is integrated therewith. In other cases, aerial control system 415 is a separate processor using software or dedicated hardware to control the drone 102 including ascending, descending, turning, taking off, landing, and performing whatever aerial maneuvers, whether independently, under control of controller 403, or under control (or partial control) of the vehicle via communication link 448. Like the remainder of the components of the drone 102, the controller 403 and aerial control system 415 may be coupled to the transceiver 477 and hence the data link 448 via bus 424. The bus 424 is shown in this example as including a single connection to each element. However, in other cases the bus 424 may be partitioned into a plurality of wires, traces, or other conductors for exchanging data between the components of the drone 102.

In some aspects, the drone 102 may include a display 411. The display may be rudimentary as in one or more light emitting diodes (LED) screens. In other examples, the display 411 may be a more sophisticated liquid crystal display (LCD), LED or other display for listing route information. This feature may be useful for hikers that are followed by the drone, such that the drone may land and be accessible to the hikers, the latter of whom may examine the display 411 for updated route information. In other arrangements, the display 411 is not present, and the data may instead be routed to the smart phone or other handheld device of the hikers.

The drone sensors 429, described at length above, may vary in size, number, type, and sophistication level depending on the relative sophistication of the system and of the drone. It will be appreciated that sensors not described in this disclosure may also be included in the drone without departing from the disclosure, as the form factor, features, sophistication and functions become increasingly advanced. The drone sensors 429 may not just include those sensors used to map the topographic features of a region, but also may include sensors that assist the aerial control system 415 and/or controller 403 in navigating the drone (gyroscopes, accelerometers, altimeters, and the like).

The drone 102 may further include a dock interface 417 which may include a set of pins, plugs, or adapters included for connecting with the docking hardware 427. This connection interface enables the vehicle 123 to charge the drone 102. Further, this connection may also be a data connection which allows the respective processor 404 and controller 403 to exchange information at potentially very fast rates between the drone and vehicle. The components of the drone may be coupled together via a bus 424, which enables data from the sensors 429 to be retrieved and stored in memory 407 or flash memory 409 or transmitted via transceiver 477 to the vehicle or the mobile device application.

Referring briefly to FIG. 4A, the vehicle 123 may also be equipped with mass storage 412 used for storing the database repository of information gathered from the drone and vehicle sensors; the relevant applications, and other data used for implementing the system. Mass storage may include disk drives, hard disks, flash memory, or non-volatile memory of various kinds. Portable storage 416 may include different types of memory that may be removed from the vehicle, e.g., and replaced. Portable storage 416 in some embodiments may be usable in the drone 102. The vehicle 123 may further include one or more peripheral devices 418 including other types of displays and user interfaces, as well as computer based peripheral devices or interfaces for such devices (mice, wireless keyboards, wireless tablets, and the like).

Numerous benefits and advantages may be drawn from the disclosure. The system improves the welfare of individuals using newly fashioned offroad vehicles to explore increasingly unfamiliar territory. The system may identify potential dangers in advance and address hazardous conditions by warning the driver and providing recommendations. The recommendations may advise the driver to approach with caution once the AI system has identified a cliff or obstacle in a foggy route with low visibility, or a similar hazardous condition. The AI system may further identify one or more alternative route(s) for the vehicle occupants to consider, including less dangerous or more navigable routes. Where individuals are missing, stranded, or hurt, the system may provide emergency assistance and may guide lost individuals back to refuge. The system may perform these techniques while concurrently managing the anticipated range of the vehicle, so that the occupants do not inadvertently become stranded due to running out of power/fuel/electricity.

Another understood advantage is that the vehicle brings unique data to applications and algorithms as described above. Thus, the vehicle may provide unique insights that drones do not possess on their own. Similarly, the vehicle advantageously provides drivers and occupants useful information to strategically plan the route in advance. The driver may uniquely comprehend the route's characteristics in terms of overall path condition and obstacles to be tackled, within the reach and capabilities of the vehicle. The system may beneficially also merge drone data with vehicle data and capabilities to determine route achievability. This advantage becomes manifest when the system compares and reconciles drone mapping telemetry and vehicle characteristics, capabilities, and geometries, thereby assuring the driver that the mechanics and geometric measurements of the vehicle and its ride mode selection are adequate to traverse the route at issue, and avoid dangers such as floods, avalanches, landslides, bad weather conditions, obstacles and other hazardous conditions to achieve a successful offroad experience and optionally a successful hike from the vehicle.

As in previously discussed aspects, the vehicle processor may receive an internal or external trigger to deploy the drone to aerially scout the terrain in a target region to provide sensor data to the vehicle and/or to perform independent computations based on the data to assess the presence of a potential emergency situation. Benefits of the emergency system may be largely increased by the drone presence. Upon deployment, the drone may survey a region, locate a lost or stranded person, and communicate with the person using a mobile device on the person to aid in providing guidance or other assistance to the person. The sensor data received by the drone may be invaluable in addressing and resolving potential emergency situations. Example input data conveyed from the drone to the vehicle over the data link established therebetween includes inclination data, approach and departure angles, slope angles, identification and presence of obstacles, temperatures, types of pavements, presence of rivers, lakes or other bodies of water, and other data including identification of artificial obstacles (cell towers, structures and the like).

This and other data may be used by the telemetry systems of the drone or vehicle to identify other potential dangers. Examples include where the processor determines that rocks detected by the drone sensors are taller than an undercarriage clearance of the vehicle. Similarly, the processor may identify an obstacle, such as the rocks detected by the drone, and may determine that the vehicle specifications and its capabilities are unable to overcome the obstacle height, or such obstacle may cause the vehicle to roller or become inoperative. As another illustration, the drone may identify trees near the pathway. The processor may determine that the distance between the two trees as conveyed by the drone is too narrow for the vehicle, with its width, to pass. Warnings and appropriate alternatives may be conveyed to the driver.

While the drone-assisted vehicle emergency system has been largely discussed in the context of offroad applications, the system may extend to other purposes, such as commuting. Dangers that may be encountered offroad may also be present in existing roads, that may sometimes give way to unexpected obstacles and other hazardous conditions. These include foggy or rainy conditions that bring low visibility, inclinations, approach and departure angles, size and level of difficulty for the rocks, ravine, and other obstacles ahead, soil conditions (rocks, gravel, mud, sand being dry or wet) ahead, depth of rivers and streams, lakes or potholes size and depth ahead, etc. The drone or the processing system may further use historical data to assist in detecting movement and classifying the type of object (e.g., animals or humans). The large field of view of the drone and its sensors may provide significant benefits to the user in identifying dangers sufficiently in advance. The processing system may also run predictive algorithms as noted to detect and characterize existing vehicle paths (e.g., twin tread grooves) ahead, such as when an alternative route is immediately needed for avoiding a hazard.

The drone beneficially may also act as an extended antenna. That is to say, the drone is capable of flying above obstacles to improve cell service and successfully alert emergency assistance. Other benefits of the AI system include energy management and identifying less dangerous routes not previously mapped (or never used) as a trail before. Even if no cellular network is nearby, the processing system may be equipped with another type of network tied to the drone, whether short or long-range Bluetooth or another technology. Other benefits include adding night vision to the drone, which may facilitate handling emergencies on a long cold night. In some aspects, the AI system may advantageously be used as an add-on system for rangers, law enforcement, paramedics, and other professionals.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A drone-assisted vehicle emergency system, the system comprising:

an offroad vehicle having integrated therein a processing system coupled to a user interface, the processing system configured to respond to a potential emergency situation; and an aerial drone communicatively coupled to the vehicle, the drone comprising a controller coupled to sensors for receiving data, the vehicle and the drone configured to communicate using a wireless data link;

wherein the processing system is further configured to determine an estimated time of arrival (ETA) with an ETA algorithm at a final hiking destination remote from the vehicle based on a level of skill hiking and historical hiking experiences on a predetermined hiking path or a related route entered by a person into the user interface on the vehicle;

wherein responsive to a trigger, the processing system is configured to instruct the drone to deploy one or more times at or immediately prior to the ETA and determine if the person is located at the final hiking destination and search the predetermined hiking path from the final hiking destination to the offroad vehicle to locate the person being stranded or lost if not identified at the final hiking destination at a predetermined time based on the ETA;

wherein during one of the deployments, the drone is configured to receive data from at least one of the sensors relevant to the potential emergency situation including the person, being stranded or lost, and to relay the data back to the vehicle for a determination by the processing system of a remedial response thereto;

wherein during at least one of the deployments, the drone is configured to provide directions or requests for data to an application on a mobile device in a possession of, or proximate the person being stranded or lost;

wherein upon locating the person being stranded or lost and determining a need for assistance, the drone is configured to maneuver to a location having cellular coverage and to transmit a signal notifying a third party of the person being stranded or lost; and wherein upon receiving confirmation of receipt of the notification from the third party, the drone is configured to return to the location of the person being stranded or lost and notify the person being stranded or lost through the mobile device of the third party confirmation of receipt.

2. The system of claim 1, wherein the potential emergency situation further includes a stranded or lost vehicle, or a hazardous condition in a prospective path of the vehicle.

3. The system of claim 2, wherein upon receiving data at the vehicle from the drone relevant to the detected hazardous condition, the processing system is configured to selectively provide, via the user interface, information comprising a warning, or a recommendation for successfully evading the detected hazardous condition.

4. The system of claim 2, wherein the hazardous condition comprises unnavigable terrain, unstable soil conditions, a wildfire, a fallen tree, a narrow passage bordering a steep incline, fog, rain, low visibility, an object or debris on the path, an obstacle subjecting the vehicle to a potential rollover, or a landslide risk based on an evaluated region of inclined terrain proximate the path of the vehicle, the evaluated region being detected to include heavily saturated soil or moving rocks.

5. The system of claim 2, wherein during at least one of the deployments, the drone is configured to receive sensor data including communications from the person relevant to a condition of the person using the application on the mobile device with the person and to relay at least relevant portions of the communications to the vehicle.

6. The system of claim 2, wherein the drone is further configured to transmit data received from one or more of the sensors relevant to a location of the stranded or lost person relative to the vehicle or to a designated facility.

7. The system of claim 1, wherein the trigger comprises an expiration of a timer based on the ETA.

8. The system of claim 7, wherein:
the timer is set by the person being stranded or lost in the vehicle or another vehicle occupant prior to the person departing the vehicle on foot, and
the drone is configured to attempt to locate the person being stranded or lost in a target region.

9. The system of claim 8, wherein upon identifying person being stranded or lost, the drone is configured to perform controlled maneuvers to guide the person in returning to the vehicle.

10. A drone-assisted vehicle emergency system, the system comprising:
an offroad vehicle having integrated therein a processing system coupled to a user interface, the processing system configured to respond to an emergency situation including detecting and assisting a person being stranded or lost originating on foot from the vehicle, wherein the emergency situation includes determining that the person failed to reach a final hiking destination remote from the vehicle at a predetermined time based on an expected time of arrival (ETA) determined by an ETA algorithm, wherein the ETA algorithm determines the ETA at the final hiking destination based on a level of skill hiking and historical hiking experiences on the predetermined route or a related route entered by the person into the user interface on the vehicle; and an aerial drone communicatively coupled to the vehicle, the drone comprising a controller coupled to sensors for receiving data, the vehicle and the drone configured to communicate using a wireless data link;

wherein responsive to a trigger, the processing system is configured to instruct the drone to deploy one or more times at or immediately prior to the ETA; and wherein during one of the deployments, the drone is configured to; survey a target region including the final hiking destination, receive data from the sensors for identifying the person including determining if the person is located at the final hiking destination and searching a predetermined hiking path from the final hiking destination to the offroad vehicle to locate the person being stranded or lost if not identified at the final hiking destination at a predetermined time based on the ETA, transmit to the vehicle a location of the person being stranded or lost, and provide assistance to the person being stranded or lost in returning to a location of refuge or in receiving third party assistance.

11. The system of claim 10, wherein the drone is configured to provide the assistance by performing one or more of (i) communicating instructions or receiving feedback to or from the person being stranded or lost, respectively, via a mobile device on the person, (ii) performing guiding maneuvers to accompany the person being stranded or lost back to the vehicle or the location of refuge, (iii) notifying emergency services, directly or via the vehicle, or (iv) notifying the person being stranded or lost that emergency assistance has been alerted and are engaging to provide assistance.

12. The system of claim 11, wherein, upon receiving at the vehicle from the drone the location of the person being stranded or lost, the processing system is configured to evaluate a remedial course of action and to send instructions relating thereto to the drone.

13. The system of claim 10, wherein the drone is configured to return to the vehicle when needed to recharge or receive a new battery.

14. The system of claim 13, wherein:
a hazardous condition is identified by an occupant using the user interface to instruct the processing system to deploy the drone to survey a target region ahead of the vehicle; and
the processing system is configured to determine remedial responses upon receiving data identifying the hazardous condition, at least one of the remedial responses including deploying the drone one or more times to identify details of the hazardous condition and an alternative route to avoid the hazardous condition.

15. The system of claim 10, wherein the processing system is configured with an energy management system to determine a potentially low energy condition of the vehicle and to issue a warning to advise a driver to return the vehicle to a point of origin prior to the vehicle losing power.

16. The system of claim 10, wherein upon identifying the person being stranded or lost, the drone is configured to perform controlled maneuvers to guide the person in returning to the vehicle.

17. The system of claim 10, wherein during at least one of the deployments, the drone is configured to receive sensor data including communications from the person being stranded or lost relevant to a condition of the person using an application on a mobile device with the person and to relay at least relevant portions of the communications to the vehicle.

18. A drone-assisted emergency vehicle system, the system comprising:
an offroad vehicle including a processing system coupled to a user interface, the processing system including a memory for storing executable code that, when executed on the processing system, performs tasks responsive to a prospective emergency situation; and
an aerial drone equipped with sensors coupled to a controller to receive data, wherein:
the drone is configured to deploy based on a command from the processing system based on the controller identifying the prospective emergency situation with the prospective emergency situation including determining that a person failed to reach a final hiking destination remote from the vehicle at a predetermined time based on an expected time of arrival (ETA) determined by an ETA algorithm, wherein the ETA algorithm determines the ETA at the final hiking destination based on a level of skill hiking and historical hiking experiences on the predetermined route or a related route entered by the person into the user interface on the vehicle;
during the deployment at or immediately prior to the ETA, the drone is configured to: survey a target region including the final hiking destination and engage the sensors to receive data identifying the prospective emergency situation including determining if the person is located at the final hiking destination and searching a predetermined hiking path from the final hiking destination to the offroad vehicle to locate the person being stranded or lost if not located at the final hiking destination at the predetermined time; and
the drone is further configured to relay relevant portions of the data to the vehicle, to issue instructions and elicit feedback from the person being stranded or lost regarding a condition of the person, and to maneuver back to the vehicle or to a location having a network connection enabling the drone to request emergency assistance.

19. The system of claim 18, wherein upon identifying the person, the drone is configured to perform controlled maneuvers to guide the person being stranded or lost in returning to the vehicle; and
wherein during at least one of the deployments, the drone is configured to receive sensor data including communications from the person relevant to a condition of the person being stranded or lost using an application on a mobile device with the person and to relay at least relevant portions of the communications to the vehicle.

20. The system of claim 18, wherein the drone is configured to provide the assistance by performing one or more of (i) communicating instructions or receiving feedback to or from the person being stranded or lost, respectively, via a mobile device on the person, (ii) performing guiding maneuvers to accompany the person being stranded or lost back to the vehicle or another location of refuge, (iii) notifying emergency services, directly or via the vehicle, or (iv) notifying the person being stranded or lost that emergency assistance has been alerted and are engaging to provide assistance.

* * * * *